United States Patent
Awatsu et al.

(10) Patent No.: US 7,729,518 B2
(45) Date of Patent: Jun. 1, 2010

(54) BIOMETRICS AUTHENTICATION METHOD BIOMETRICS AUTHENTICATION DEVICE AND BLOOD VESSEL IMAGE READING DEVICE

(75) Inventors: Kiyotaka Awatsu, Inagi (JP); Masanori Ohkoshi, Inagi (JP); Takahiro Kudoh, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1126 days.

(21) Appl. No.: 11/347,411

(22) Filed: Feb. 6, 2006

(65) Prior Publication Data

US 2007/0003112 A1    Jan. 4, 2007

(30) Foreign Application Priority Data

Jun. 30, 2005   (JP)   ............... 2005-192869

(51) Int. Cl.
*G06K 9/00*   (2006.01)
(52) U.S. Cl. .............. 382/115; 382/124; 340/5.53; 340/5.83
(58) Field of Classification Search .......... 382/115, 382/116, 124, 126, 127, 128; 340/5.52, 5.53, 340/5.82, 5.83
See application file for complete search history.

(56) References Cited

U.S. PATENT DOCUMENTS

| | | | | |
|---|---|---|---|---|
| 4,699,149 | A * | 10/1987 | Rice | 600/475 |
| 6,091,837 | A * | 7/2000 | Dinh | 382/124 |
| 6,177,068 | B1 | 1/2001 | Shih et al. | |
| 7,362,884 | B2 * | 4/2008 | Willis et al. | 382/116 |
| 2004/0071322 | A1 * | 4/2004 | Choshi et al. | 382/115 |
| 2005/0047632 | A1 | 3/2005 | Miura et al. | |
| 2005/0116810 | A1 * | 6/2005 | Beenau et al. | 340/5.52 |

FOREIGN PATENT DOCUMENTS

EP   0 867 830 A2   9/1998

(Continued)

OTHER PUBLICATIONS

Im et al. "A Filter Bank Algorithm for Hand Vascular Pattern Biometrics." 7th International Conference on Control, Automation, Robotics and Vision, Dec. 2002, pp. 776-781.*

(Continued)

*Primary Examiner*—Jon Chang
(74) *Attorney, Agent, or Firm*—Westerman, Hattori, Daniels & Adrian, LLP

(57) ABSTRACT

A biometrics authentication device, which uses blood vessel images of a human body to perform individual authentication, performs verification processing according to a detected body temperature. A temperature sensor, which detects the temperature of a body, is provided in a blood vessel image capture device. The temperature at the time of registration of a blood vessel image is stored together with the blood vessel image, and the temperature of the body at the time of use (at the time of verification) is detected; the temperature difference at the time of registration and at the time of use is reflected in the verification processing, and when there is a verification error, the cause of the verification error is judged from the temperatures at the time of registration and at the time of use. Whether a verification error is due to temperature can be easily distinguished.

18 Claims, 18 Drawing Sheets

FOREIGN PATENT DOCUMENTS

| | | |
|---|---|---|
| EP | 1 376 465 A1 | 1/2004 |
| EP | 1 524 621 A2 | 4/2005 |
| GB | 2 229 844 A | 10/1990 |
| JP | 2000-293643 | 10/2000 |
| JP | 2003-42849 | 2/2003 |
| JP | 2005-55323 | 3/2005 |
| JP | 2005-91375 | 4/2005 |
| KR | 10-2002-0061374 | 7/2002 |
| KR | 10-2002-0061375 A | 7/2002 |

OTHER PUBLICATIONS

Lin et al.; "Biometric Verification Using Thermal Images of Palm-Dorsa Vein Patterns", vol. 14, No. 2, Feb. 2004, pp. 199-213, XP001047822.

European Search Report, dated Jun. 1, 2006, issued in corresponding European Application No. 06 25 0656.

* cited by examiner

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

| VERIFICATION TEMPERATURE | THRESHOLD VALUE CORRECTION |
|---|---:|
| X+n | 5 |
| X+n−1 | 5 |
| ⋮ | |
| X+1 | 3 |
| X | 2 |
| X−1 | 1 |
| ⋮ | |
| X−n+1 | −4 |
| X−n | −5 |

BIOMETRICS AUTHENTICATION METHOD BIOMETRICS AUTHENTICATION DEVICE AND BLOOD VESSEL IMAGE READING DEVICE

CROSS-REFERENCE TO RELATED APPLICATIONS

This application is based upon and claims the benefit of priority from the prior Japanese Patent Application No. 2005-192869, filed on Jun. 30, 2005, the entire contents of which are incorporated herein by reference.

BACKGROUND OF THE INVENTION

1. Field of the Invention

This invention relates to a biometrics authentication method to perform individual authentication, biometrics authentication device, and blood vessel image reading device, which utilize characteristics of images of blood vessels which are a portion of a human body, and in particular relates to a biometrics authentication method, biometrics authentication device, and blood vessel image reading device, which are suitable for use in verifying registered blood vessel image information for a body against detected blood vessel image information for a body.

2. Description of the Related Art

There are numerous portions of the human body which can be used to differentiate the individual, such as fingerprints and toeprints, the retinas of the eyes, facial features, and blood vessels. With advances in biometrics technology in recent years, various devices have been provided which identify biometrics features of a portion of the human body to authenticate individuals.

Of these, blood vessels of the palms, backs of the hands and fingers provide a comparatively large quantity of individual characteristic data, and blood vessel (vein) patterns remain unchanged throughout life from infancy and are regarded as being completely unique, and so are well-suited to individual authentication. For example, in authentication technology of the prior art employing blood vessel images of the palm, at the time of registration or of authentication the user brings his palm into proximity with an image capture device. The image capture device emits near-infrared rays, which are incident on the palm of the hand. The image capture device uses a sensor to capture near-infrared rays rebounding from the palm of the hand.

Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

In order to utilize these blood vessel images for individual authentication, the user first uses an image capture device to register vein image data of the palm of his own hand in a server or on a card. Then, in order to perform individual authentication, the user employs an image capture device to cause the vein image data of his own hand to be read. The registered vein image retrieved using the ID of the user is verified against the vein pattern of the vein image for verification thus read, and based on the degree of similarity, individual authentication is performed (see Japanese Patent Laid-open No. 2000-293643).

With the widespread adoption of such biometrics authentication devices, it is anticipated that users will make use of the devices under various environmental conditions. For example, depending on the temperature, blood vessels (such as veins) in a human body may contract or expand. Because of this, in a cold state the veins (blood vessels) may contract, so that little blood vessel image information can be read, and verification errors tend to result.

Particularly when reading blood vessel images in the hand or fingers, because the hands and fingers are often exposed directly to the outside air, the temperature of the hands and fingers changes readily depending on the environment. For example, even when the biometrics authentication device is situated indoors in a temperature-controlled environment, if the user has entered the building from a cold outdoor environment, the hands and fingers may be at low temperature. If in this state biometrics authentication is attempted, little blood vessel image information can be read, as explained above, so that a verification error may occur.

Because the technology of the prior art does not assume that biometrics authentication will be performed in such an environment, so that contraction and expansion of blood vessels at the times of registration and verification is not taken into consideration, there is the possibility that verification may fail even when the individual in question is attempting authentication. Furthermore, it cannot be judged whether the cause of the verification failure is a difference in temperature, or the fact that the blood vessel image read is not that of the individual in question.

Consequently the widespread adoption of biometrics authentication equipment is impeded, and such verification failures cause the device to be perceived as unreliable by users; hence further innovations to make possible biometrics authentication in such environments are needed.

SUMMARY OF THE INVENTION

Thus one object of the invention is to provide a biometrics authentication method, biometrics authentication device, and blood vessel image reading device which, while maintaining the security of biometrics authentication, enables biometrics authentication through blood vessel images according to the temperature of the user at the time of use.

A further object of the invention is to provide a biometrics authentication method, biometrics authentication device, and blood vessel image reading device which, even when the temperature of the user differs during registration and during use, enables appropriate biometrics authentication.

Still a further object of the invention is to provide a biometrics authentication method, biometrics authentication device, and blood vessel image reading device which, even when the temperature of the user differs during registration and during use, and a verification error occurs, can discriminate a verification error that is due to a difference in temperature.

Still a further object of the invention is to provide a biometrics authentication method, biometrics authentication device, and blood vessel image reading device which, even when the temperature of the user differs during registration and during use, and a verification error occurs, can discriminate that the cause of the verification error is due to a difference in the temperatures during registration and during use, and can take appropriate measures with respect to the user to perform biometrics authentication.

In order to attain these objects, a biometrics authentication device of this invention has an image capture device, which captures images of blood vessels in a body; a temperature detector, which detects the temperature of the body; an IC card reader/writer, which reads/writes an IC card in which is stored characteristic data of blood vessel image of the user and the temperature at the time of registration of the blood vessel image characteristic data; and a control unit, which extracts the blood vessel image characteristic data from the blood vessel image thus captured to be verified against the blood vessel image characteristic data registered in the IC card in a verification processing. And the control unit detects the temperature during capture of the blood vessel image from the temperature detector, and distinguishes the cause of a verification error from the difference in the temperature detected at the time of image capture and the temperature at the time of registration in the IC card.

A biometrics authentication method of this invention has an image capture step of capturing an image of blood vessels in a body using an image capture device; a temperature detection step of detecting the temperature of the body, using a temperature detector; a step of reading the characteristic data of a blood vessel image of a user and the temperature at the time of registration of the blood vessel image characteristic data from an IC card; a step of extracting the blood vessel image characteristic data from the captured blood vessel image and of verifying against the blood vessel image characteristic data registered in the IC card in the verification processing; and a step of detecting the temperature at the time of capture of the blood vessel image from the temperature detector, and of distinguishing the cause of a verification error from the difference between the temperature detected at the time of image capture and the temperature at the time of registration in the IC card.

A blood vessel image capture device of this invention is a blood vessel image reading device, which verifies a captured image of blood vessels in a body with a registered blood vessel image, and is used in a biometrics authentication device to perform individual authentication, has an image capture unit which captures images of blood vessels in the body, and a temperature detector which detects the temperature of the body, for reflection in the verification.

In this invention, it is preferable that the control unit modify the judgment criteria for the verification processing according to a difference between the temperature detected at the time of image capture and the temperature at the time of registration in the IC card.

In this invention, it is preferable that the control unit modify a threshold value for judging the degree of similarity in the verification processing according to a difference between the temperature detected at the time of image capture and the temperature at the time of registration in the IC card.

In this invention, it is preferable that the control unit distinguish the fact that an error in the verification is due to a difference between the temperature detected at the time of image capture and the temperature at the time of registration in the IC card, and display a guidance screen on a display portion prompting the user to warm the body part from which the blood vessel image is captured.

In this invention, it is preferable that the device further has a heater unit for warming the user body part from which the blood vessel image is captured, and that the control unit distinguish the fact that an error in the verification is due to a difference between the temperature detected at the time of image capture and the temperature at the time of registration in the IC card, and operate the heater unit.

In this invention, it is preferable that the temperature detector be provided in the image capture device.

In this invention, it is preferable that the heater unit be provided in the image capture device.

In this invention, it is preferable that the control unit have a table which stores correction values of threshold values used as a criterion for similarity judgments in the verification processing, according to the difference between the detected temperature at the time of image capture and the temperature at the time of registration in the IC card, and that this table be referenced to modify the threshold value of a criterion for judgments of the degree of similarity in the verification processing.

In this invention, by storing the temperature at the time of blood vessel image registration together with the blood vessel image, and by detecting the temperature of the body at the time of use (at the time of verification), the difference in temperatures at the time of registration and at the time of use can be reflected in the verification processing. And in the event of a verification error, the cause of the verification error can be judged from the temperatures during registration and during use, so that whether a verification error is due to a temperature difference can be easily distinguished.

DESCRIPTION OF THE PREFERRED EMBODIMENTS

Below, embodiments of the invention are explained in the order of a biometrics authentication system, biometrics authentication processing, biometrics authentication configuration, biometrics characteristic data registration processing, biometrics characteristic data authentication processing, other biometrics authentication mechanisms, other biometrics characteristic data authentication processing, and other embodiments.

Biometrics Authentication System

Figure 1:
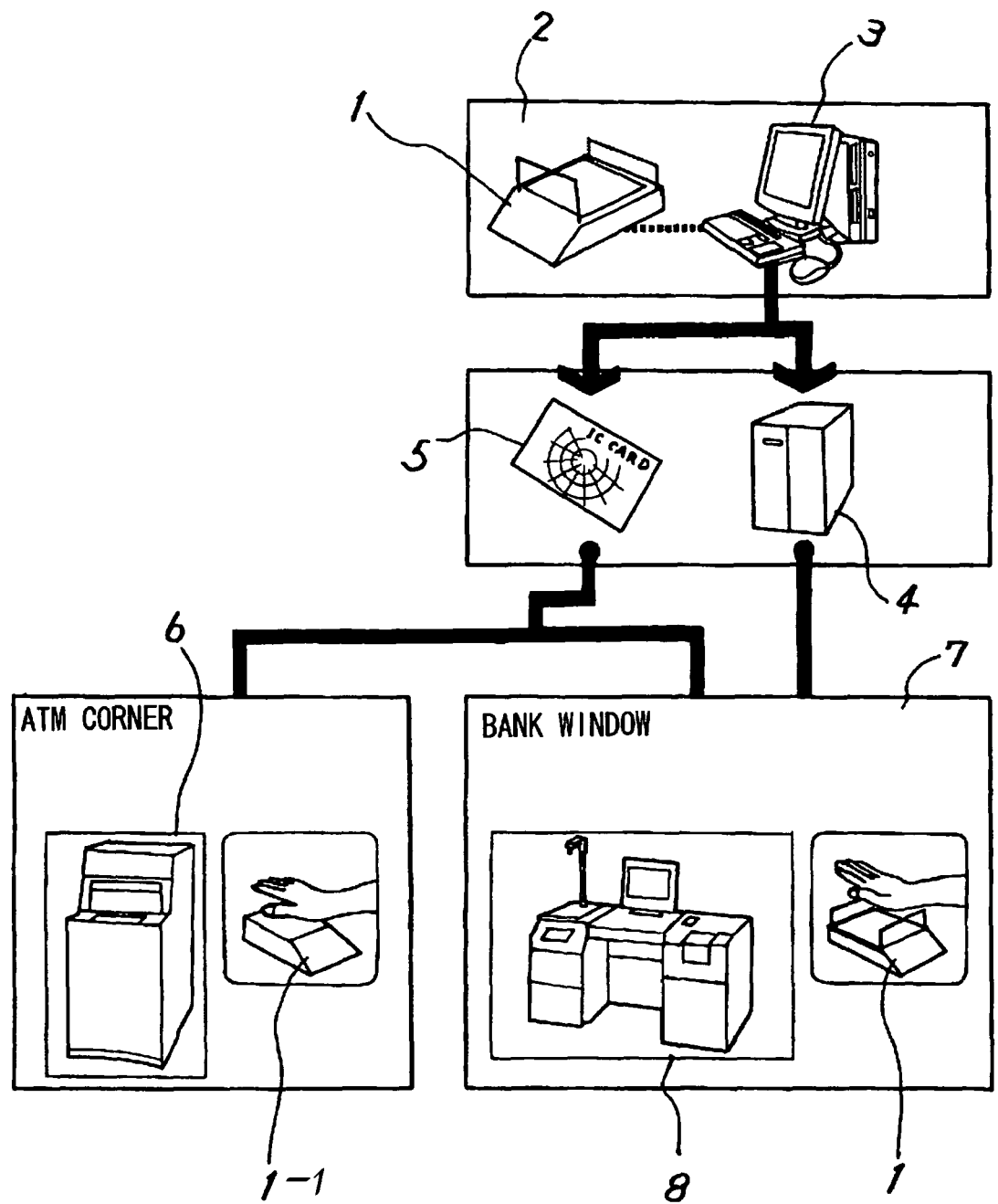
FIG. 1 shows the configuration of the biometrics authentication system of one embodiment of the invention.
Figure 2:
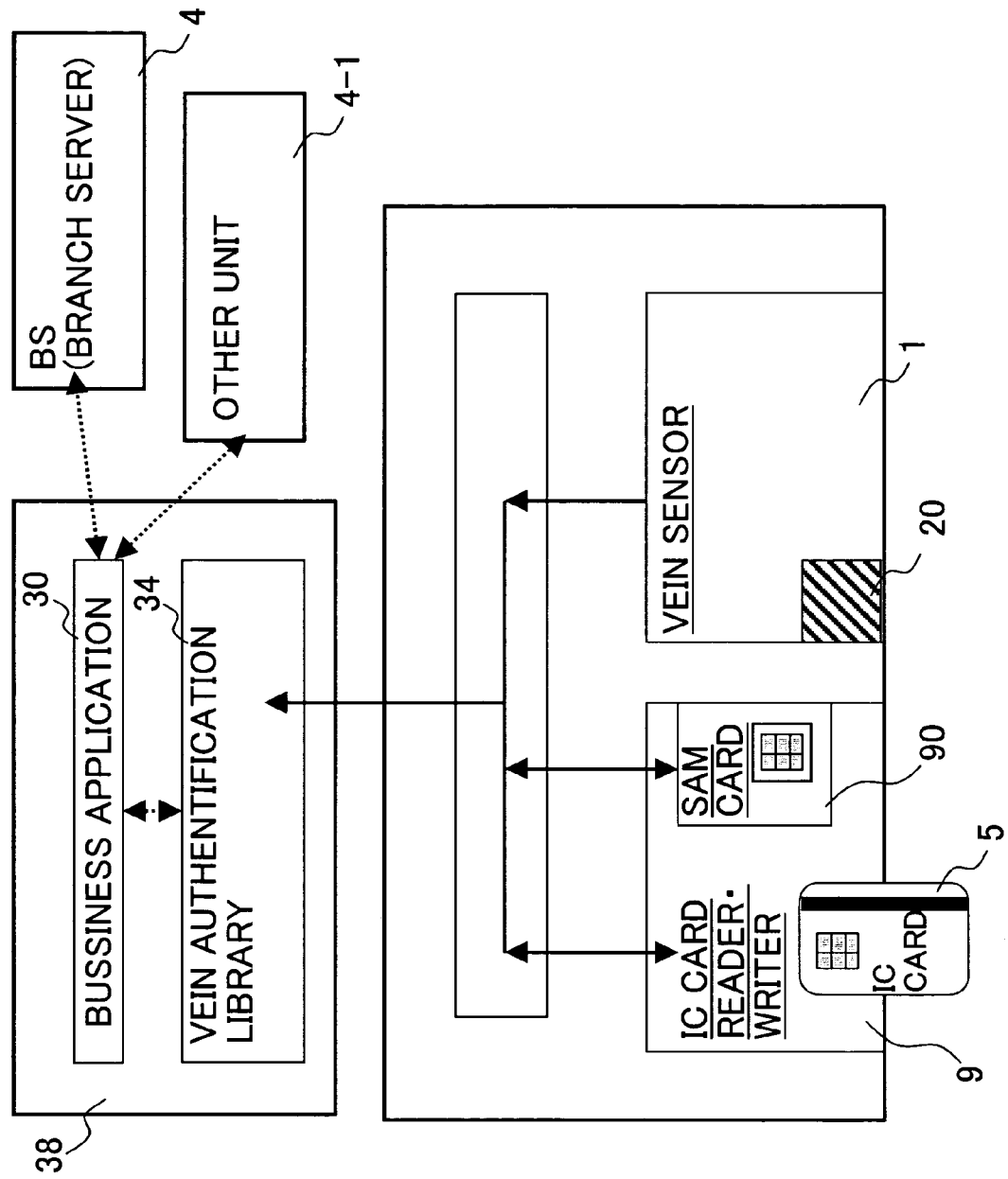
FIG. 2 shows the configuration of the service area device of FIG. 1.
Figure 3:
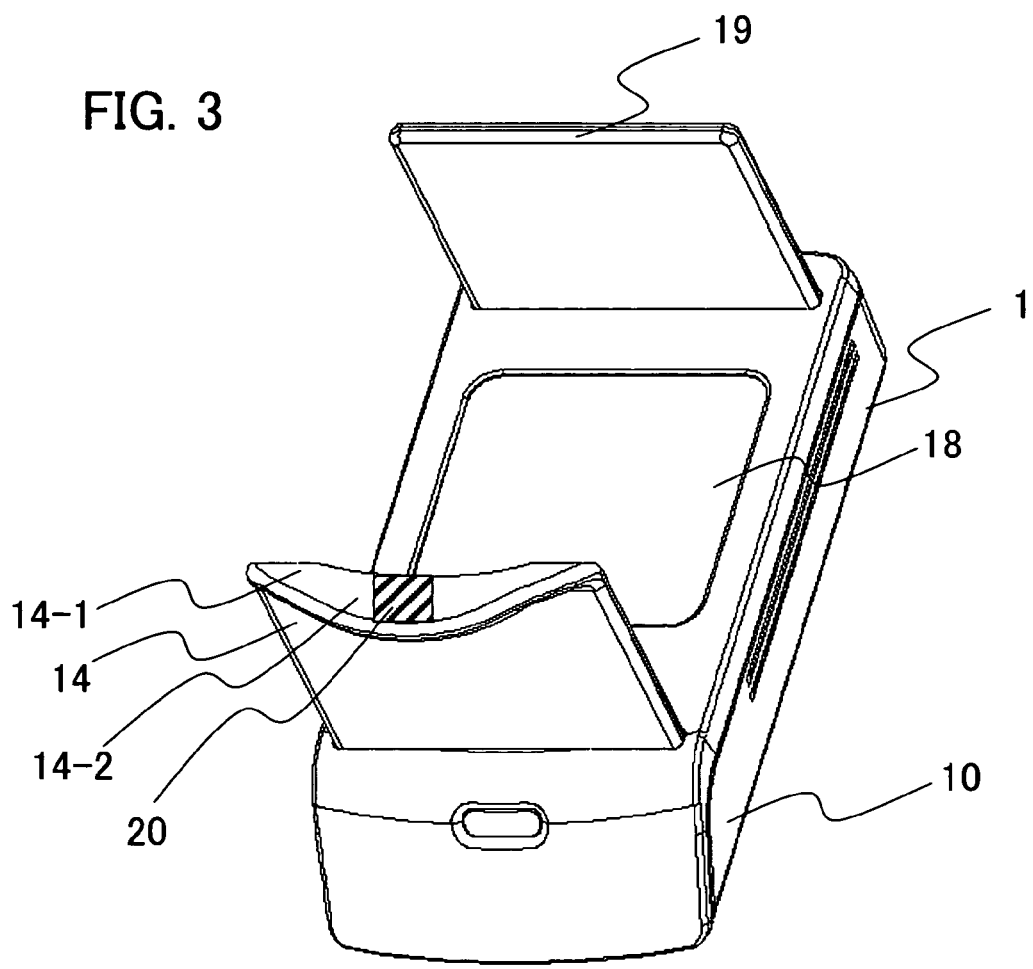
FIG. 3 is an external view of the image capture device of FIG. 1.
Figure 4:
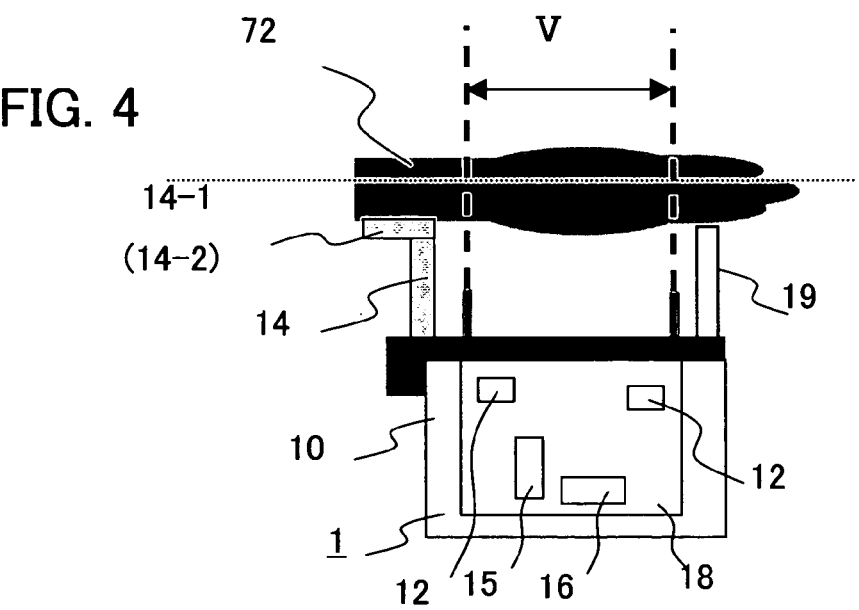
FIG. 4 shows the configuration of the image capture device of FIG. 3.
Figure 5:
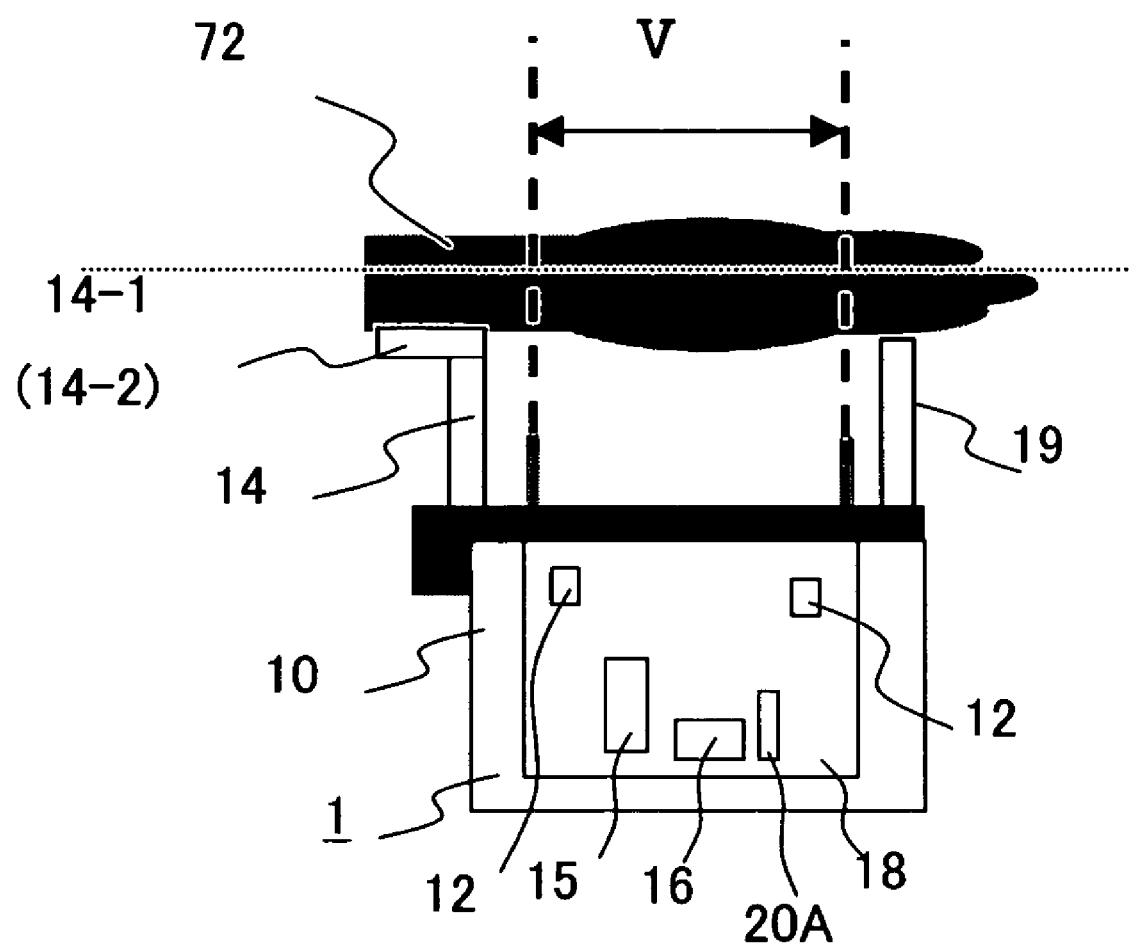
FIG. 5 shows another configuration of the image capture device of FIG. 1.
Figure 6:
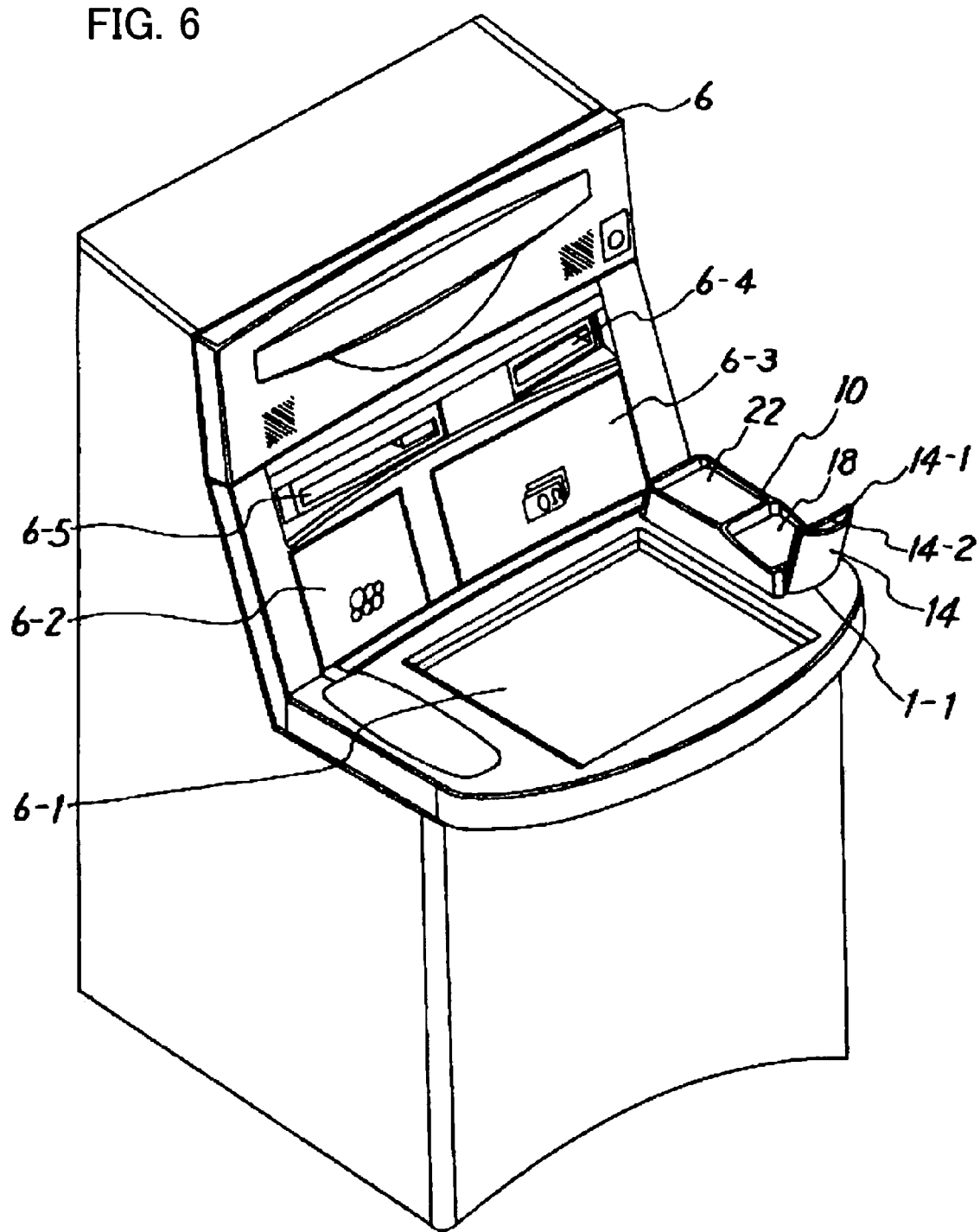
FIG. 6 is an external view of the ATM of FIG. 1.
Figure 7:
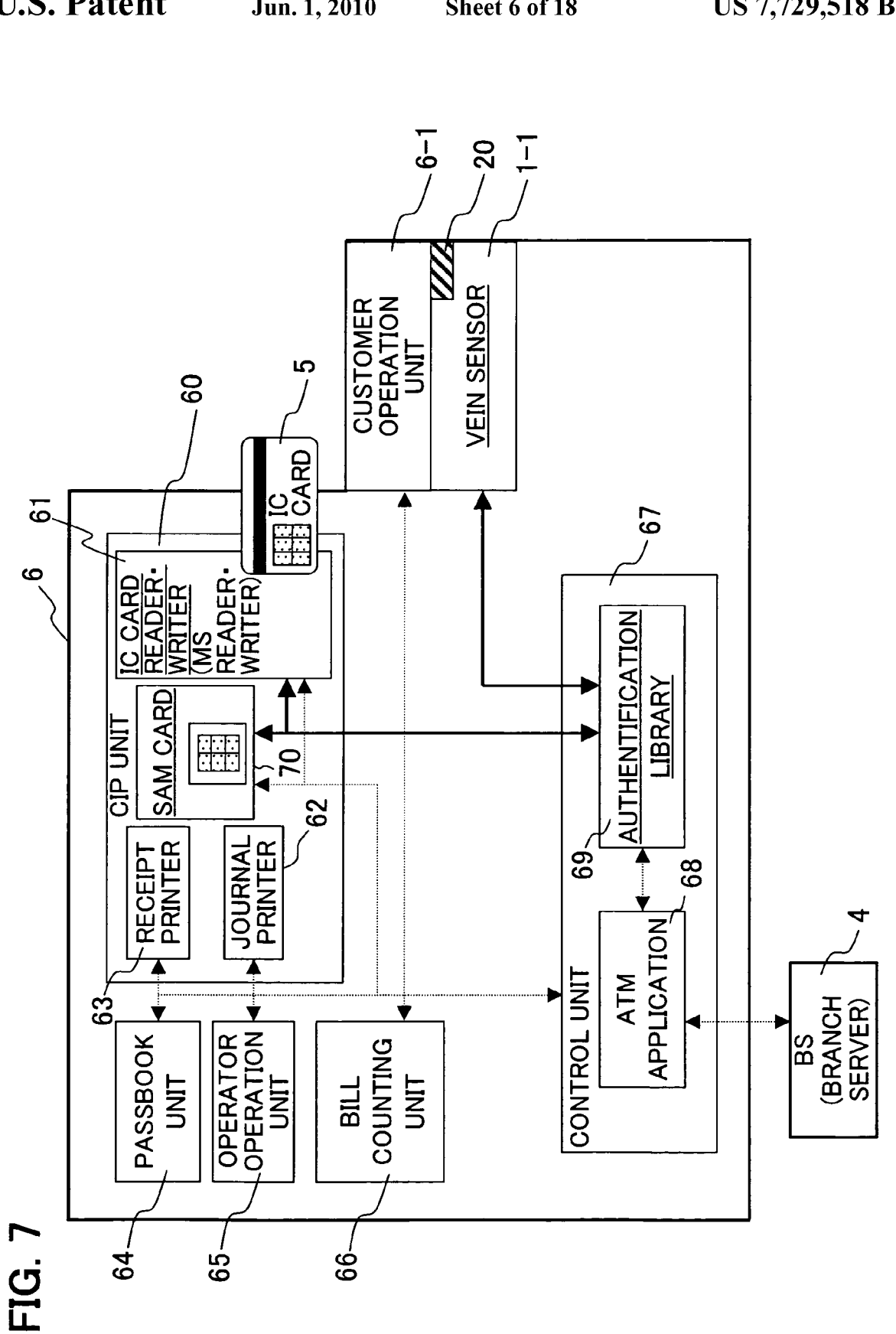
FIG. 7 is a block diagram of the ATM of FIG. 6.

FIG. 1 shows the configuration of the biometrics authentication system of one embodiment of the invention, FIG. 2 shows the configuration of the business terminal device/service area terminal device of FIG. 1, FIG. 3 is an external view of the image capture device of FIG. 1 and FIG. 2, FIG. 4 shows the configuration of the palm image capture device of FIG. 3, FIG. 5 shows another configuration of the image capture device of FIG. 1 and FIG. 2, FIG. 6 is an external view of the automated transaction machine of FIG. 1, and FIG. 7 shows the configuration of the automated transaction machine of FIG. 6.

FIG. 1 shows an example of a palm vein authentication system in a financial institution, as an example of a biometrics authentication system which uses blood vessel images. The palm image capture device 1 explained in FIG. 3, and a business branch terminal (for example, a personal computer) 3 connected thereto, are provided in a service area 2 of the financial institution. A user requesting vein authentication extends his hand over the palm image capture device 1 (hereafter "image capture device"). The image capture device 1 reads the palm image, and through blood vessel image extraction processing in the terminal device 3, the vein pattern is extracted and is registered as vein data in the terminal device 3.

This vein data is recorded in a storage unit 4a of a database server 4 connected to the terminal device 3 and on an individual card (for example, an IC card) 5 to be held by the user. This server 4 is connected to the service area terminal device 8 in the service area 7 of the financial institution; this service area terminal device 8 is connected to the image capture device 1.

In order to perform withdrawal or some other financial transaction at the service area 7 of the financial institution, the user inserts the IC card 5 into the IC card reader shown in FIG. 2, and extends his hand over the image capture device 1 provided in the service area 7. The image capture device 1 reads the palm of the hand, and the vein pattern is extracted by means of blood vessel image extraction processing in the service area terminal device 8. The service area terminal 8 performs verification processing to verify the vein pattern, as vein data, against the vein data registered in the IC card 5, and authenticates the individual.

The server 4 is connected to the ATM (automated deposit/withdrawal transaction machine) 6 of the financial institution, and the ATM 6 can be used to perform transactions based on vein authentication. In order for the user to use the ATM 6 to make a withdrawal or perform some other financial transaction, he extends his hand over the image capture device 1-1 provided in the ATM 6. The image capture device 1-1 reads the palm of the hand. Similarly to the service area terminal device 8, the ATM 6 extracts the vein image (blood vessel image), verifies the vein image, as vein data, against the vein data registered in the IC card 5 possessed by the user, and authenticates the individual.

FIG. 2 and FIG. 3 show the configuration of the business/service area terminal devices 3 and 8 of FIG. 1. As shown in FIG. 2, the terminal devices 3 and 8 are mounted a business application 30 and a vein authentication library (program) 34. On the other hand, the terminal devices 3 and 8 are connected to the vein sensor (palm image capture device) 1 and IC card reader/writer 9.

The IC card reader/writer 9 performs reading and writing of the IC chip and magnetic stripe in the IC card 5 of the user. A secure access module (SAM) is provided in the IC card reader/writer 9, so that only authorized access is accepted, thus maintaining the security of the IC card 5.

As indicated in FIG. 3, the palm image capture devices 1, 1-1 of FIG. 1 and FIG. 2 have a sensor unit 18 mounted substantially in the center of the main unit 10. On the forward portion (on the user side) of the sensor unit 18 is provided a front guide 14; on the rear side is provided a rear guide 19. The front guide 14 comprises a sheet of synthetic resin, transparent or substantially transparent. The front guide 14 serves the purposes of guiding the hand of the user in the front and of supporting the wrist.

Hence as shown in FIG. 4, the front guide 14 provides guidance to the user to guide and support the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves to support the fingers.

A contact-type temperature sensor 20 is provided on the horizontal portion 14-1 which supports the wrist. The contact-type temperature sensor 20 comprises, for example, a resistive film the resistance of which changes with temperature; when the user places his wrist on the horizontal portion 14-1 of the front guide 14, as in FIG. 4, the contact-type temperature sensor 20 makes contact with the wrist, and detects the temperature of the wrist (that is, the temperature of the hand).

As shown in FIG. 4, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported palm is positioned in the readable region V. When the hand 72 is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 4, by having the front guide 14 support the wrist above the sensor unit 18, the user's hand can be guided and supported such that the position, inclination and height of the palm above the sensor unit 18 are made precise with respect to the image capture range of the sensor unit 18.

Next, FIG. 5 is used to explain palm image capture devices 1, 1-1 of another type. In FIG. 5, portions which are the same as in FIG. 3 and FIG. 4 are assigned the same symbols. That is, the sensor unit 18 is mounted substantially in the center of the main unit 10. The front guide 14 is provided in the front portion (the user side) of the sensor unit 18, and the rear guide 19 is provided in the rear portion. Similarly, the front guide 14 serves to guide the hand in the front, and to support the wrist.

Hence as indicated in FIG. 4, the attitude, which is the position, inclination, and size, of the palm is regulated above the sensor unit 18. Further, the cross-sectional shape of the front guide 14 has a vertical body and, in the upper portion, a horizontal portion 14-1 which supports the wrist. A depression 14-2 is formed continuously in the center of the horizontal portion 14-1, to facilitate positioning of the wrist. The rear guide 19 serves to support the fingers.

As indicated in FIG. 5, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

Further, within the sensor 18 is provided a contact-free temperature sensor 20A. The contact-free temperature sensor 20A comprises, for example, an infrared-ray sensor (thermopile) which detects infrared rays from an object. Hence when the user places his wrist on the horizontal portion 14-1 of the front guide 14 as in FIG. 5, the contact-free temperature sensor 20A receives infrared rays from the palm of the hand, and detects the temperature of the wrist (that is, the hand temperature).

Next, the automated transaction machine of FIG. 1 and FIG. 2 is explained using FIG. 6 and FIG. 7. As shown in FIG. 6, the ATM (automated transaction machine) 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display.

In this example, the image capture device 1-1 is provided on the side of the customer operation panel 6-1. The sensor unit 18 explained in FIG. 4 is mounted on the forward side of the main unit 10 of the image capture device 1-1. On the forward portion (on the user side) of the sensor unit 18 is provided a front guide 14. The front guide 14 comprises a sheet of synthetic resin, transparent or substantially transparent. The front guide 14 serves to guide the hand to the front, and to support the wrist; to this end, the cross-sectional shape has a vertical body and, in the top portion, a horizontal portion 14-1 to support the wrist. A depression 14-2 is formed continuously in the center of the horizontal portion 14-1, to facilitate positioning of the wrist.

Further, the sensor unit 18 of the main unit 10 faces rearward and is inclined upward, and a flat portion 22 is provided therebehind. Also, similarly to FIG. 3 and FIG. 5, a contact-type temperature sensor 20 is provided on the horizontal portion 14-1 of the front guide 14, or, a contact-free temperature sensor 20A is provided within the sensor 18.

As shown in FIG. 7, the ATM 6 has a CIP (Card Reader Printer) unit 60 with a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation portion 65; a control portion 67; a customer operation panel (UOP) 6-1 for operation and display; and an image capture device (vein sensor) 1-1.

The CIP unit 60 has an IC card reader/writer 61 which reads and writes the magnetic stripe and IC chip of an IC card 5; a receipt printer 63 which records transactions on a receipt; a journal printer 62 which prints the history of transactions on journal forms; and a secure access module (SAM) 70.

The bankbook unit 64 records transactions on pages of a bankbook, and when necessary turns the pages. The attendant operation unit 65 displays the state and performs operations upon occurrence of a fault or during inspections by the attendant. The paper currency/coin counting unit 66 validates, counts, and stores inserted paper currency and coins, and counts and dispenses paper currency and coins in the required quantities.

The control unit 67 communicates with the server 4, and has an ATM application 68 which controls ATM operation and an authentication library (program) 69 for authentication processing. A portion of this ATM application 68 acts in concert with the authentication library 69 to control biometrics authentication guidance screens of the UOP 6-1.

Biometrics Authentication Processing Method

Figure 8:
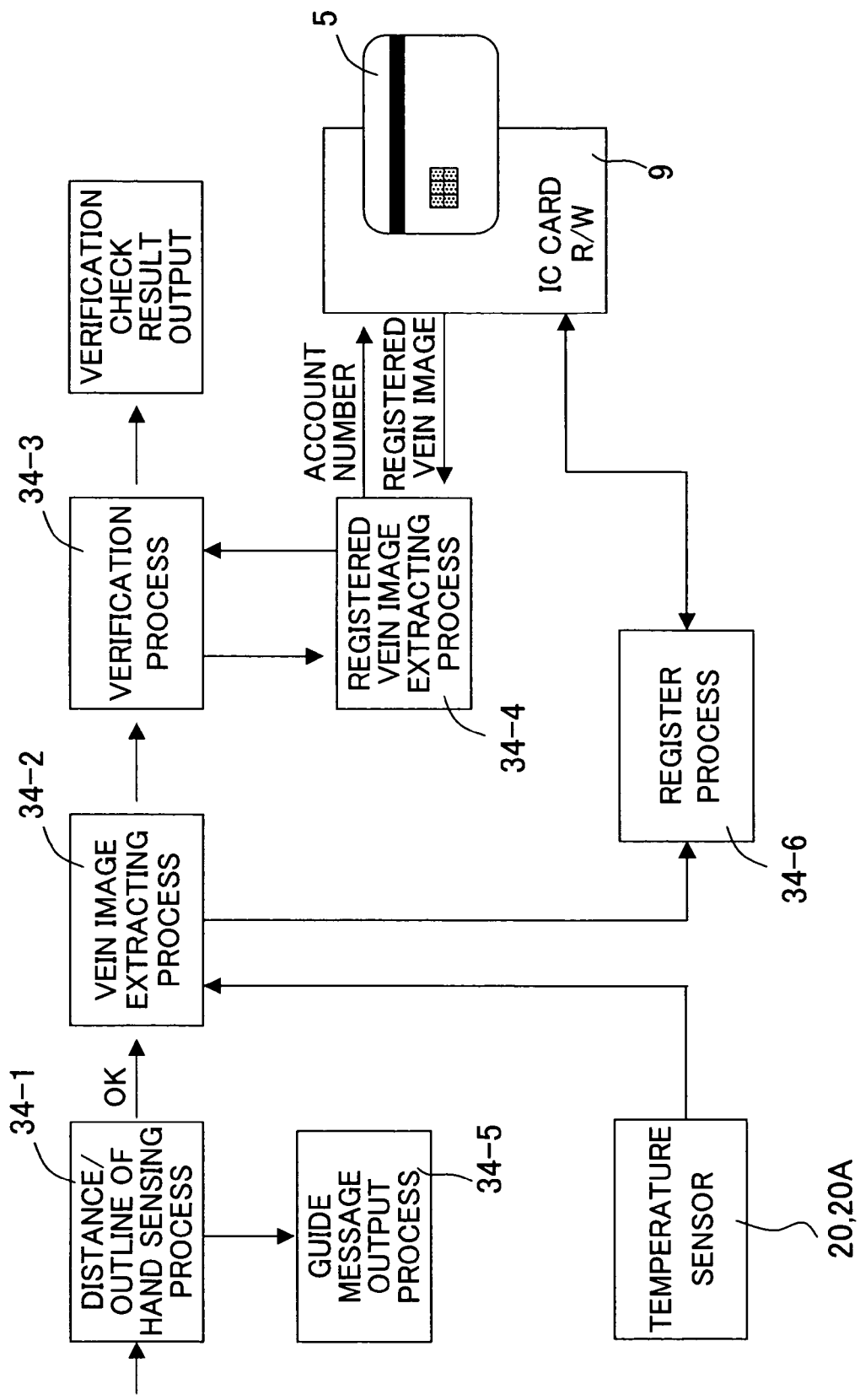
FIG. 8 is a functional block diagram of biometrics information registration/verification processing in an embodiment of the invention.
Figures 9, 10:
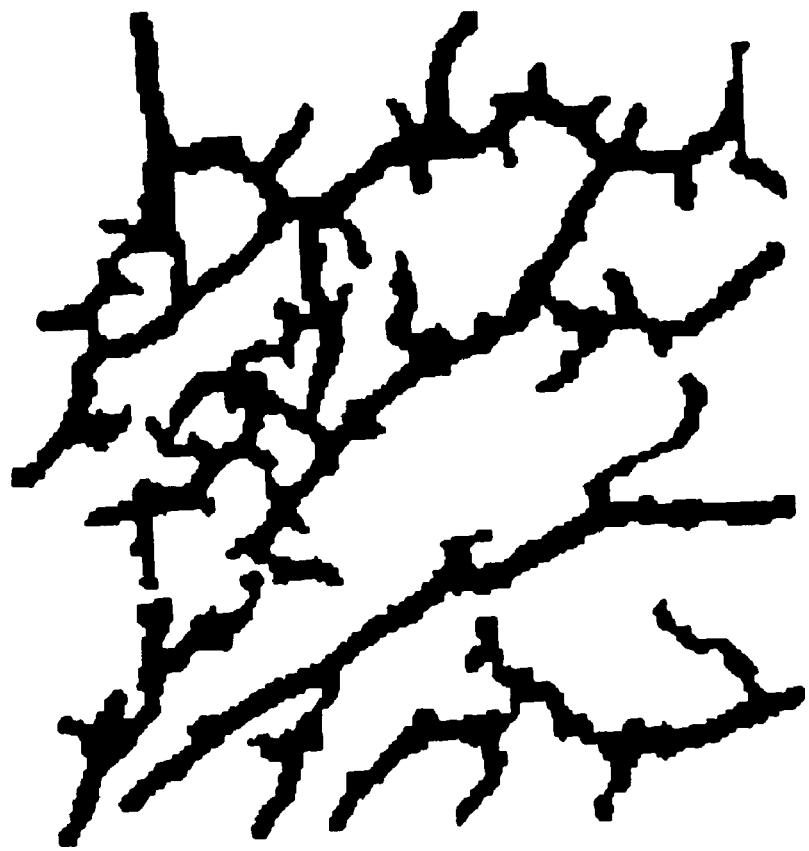
FIG. 9 explains blood vessel images in FIG. 8.
FIG. 10 explains the blood vessel image data of FIG. 9.

FIG. 8 is a block diagram of biometrics authentication processing in an embodiment of the invention, FIG. 9 explains blood vessel images in FIG. 8, and FIG. 10 explains the verification processing of FIG. 8.

As shown in FIG. 8, the authentication library 34 of the service area devices 3 and 8 connected to the image capture device 1 execute the series of registration and verification processing 34-1 to 34-6; similarly for the authentication library 69 of the control unit 67 of the ATM 6. The control unit 67 in the service area devices 3, 8 and ATM 6 have, for example, a CPU, various types of memory, an interface circuit, and other circuitry necessary for data processing. The CPU executes the series of registration and verification processing 34-1 to 34-6. As explained below, the IC chip in the IC card 5 also executes verification processing 34-3.

Distance/hand outline detection processing 34-1 receives the distance measured by the distance sensor 15 of the image capture devices 1, 1-1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 34-5 outputs, to the displays of the service area devices 3, 8 and UOP 6-1 of the ATM 6, a message to guide the palm to the left or right, forward or backward, upward or downward, when the distance measured by the distance sensor 15 or the position of the hand according to hand outline extraction indicates that the hand is outside the image capture range, or when the image cannot be used in registration and verification processing. By this means, the palm of the hand of the user is guided into position over the image capture devices 1, 1-1.

Blood vessel image extraction processing 34-2 extracts a vein image from the image of the hand when hand outline detection processing 34-1 judges that an image has been captured with the hand held correctly. That is, grayscale data of the image of the palm such as that of FIG. 10 is obtained through differences in reflectivity. The vein image is an image like that shown in FIG. 9; the data is grayscale data such as that in FIG. 10. The blood vessel image extraction processing 34-2 further extracts characteristics of the blood vessel image (the directions and numbers of trunks and branches of blood vessels, and similar), determined in advance, from the blood vessel image data of FIG. 10.

Registered blood vessel search processing 34-4 retrieves registered blood vessel image data A, B corresponding to the individual ID (account number) obtained from the storage portion of the IC card 5 shown in FIG. 1, FIG. 2, and FIG. 7. Verification processing 34-3 compares the blood vessel image data N1 detected in blood vessel image detection processing 34-2 with registered blood vessel image data N2, performs verification processing, and outputs the verification result, as shown in FIG. 10.

In registration processing 34-6, blood vessel image characteristic data is extracted from detected blood vessel image data and is stored in the IC chip 50 of the IC card 5 via the IC card reader/writers 9, 61. As explained below, the temperature of the hand detected by the temperature sensors 20, 20A is sent to the blood vessel image extraction processing 34-2, and is used in verification processing 34-3 and registration processing 34-6.

Thus in this invention, the temperature detected by the temperature sensors 20, 20A of the image capture devices 1, 1-1 is used in verification processing and registration processing.

Biometrics Authentication Configuration

Figure 11:
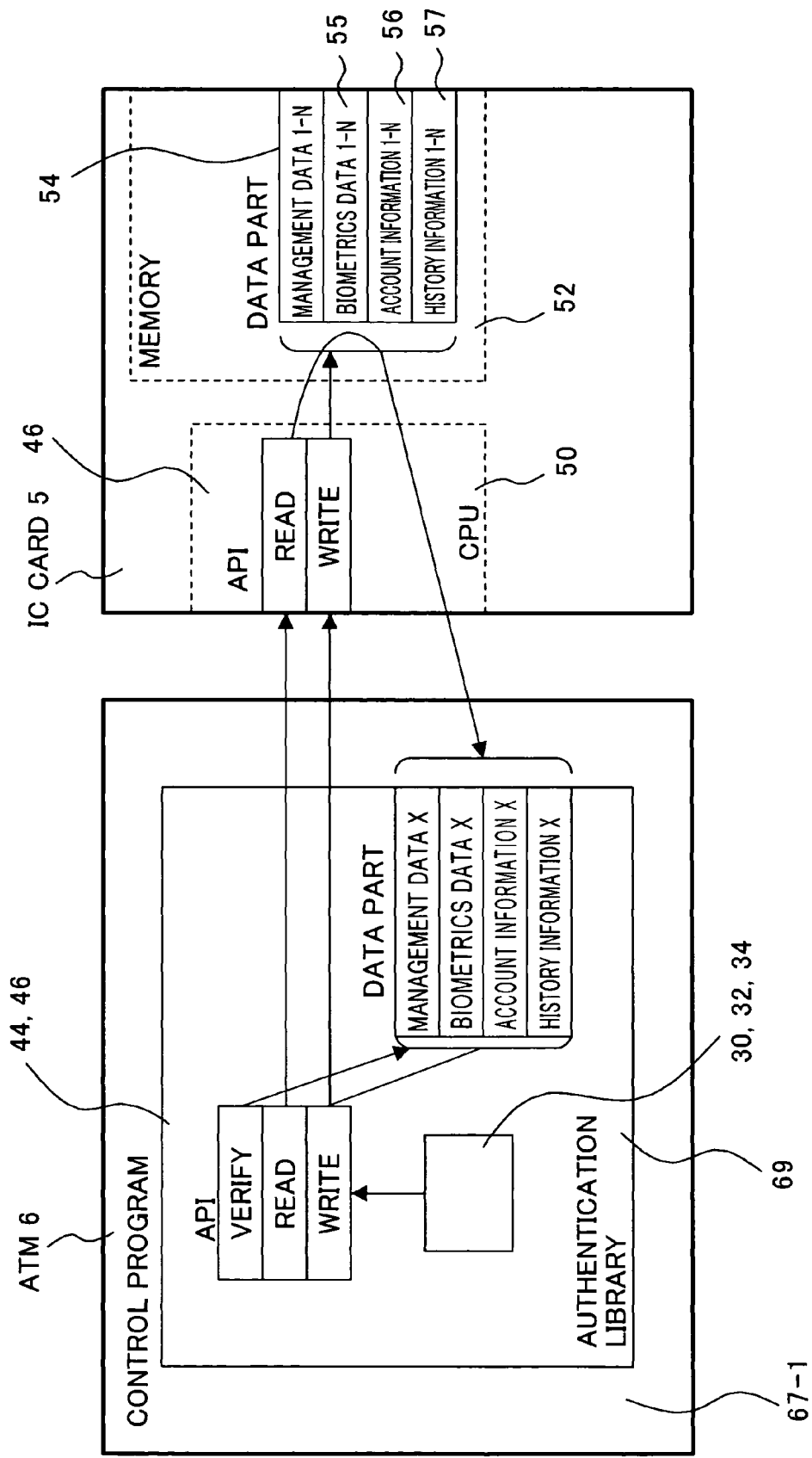
FIG. 11 is a block diagram of the configuration for biometrics authentication of an embodiment of the invention.
Figure 12:
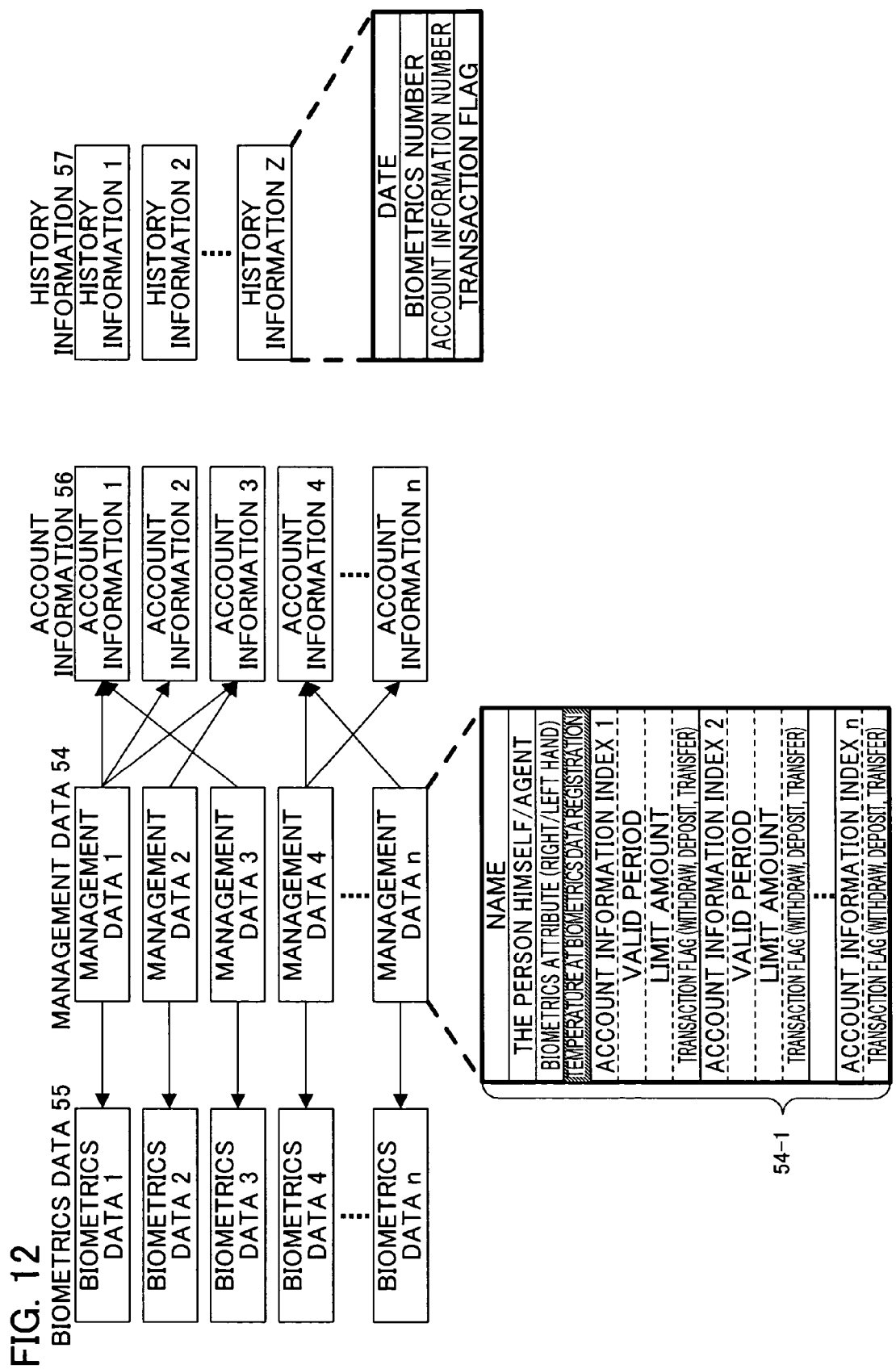
FIG. 12 shows the data configuration of the IC card of FIG. 11.

Next, FIG. 11 and FIG. 12 are used to explain the biometrics authentication configuration of FIG. 2, FIG. 7 and FIG. 8. FIG. 11 shows the configuration of an IC card 5 and the authentication library 69 of the ATM 6 of FIG. 7 and FIG. 8; FIG. 12 shows the configuration of the data portion within the IC card 5 of FIG. 11. The business terminals 3, 8 of FIG. 2 are similarly configured.

As shown in FIG. 11, the authentication library (program) 69 provided in the control program 67-1 of the ATM 6 has the distance/hand outline detection processing 34-1, guidance message output processing 34-5, and blood vessel image extraction processing 34-2 shown in FIG. 8, and an application interface (API). This API has a portion of the verification processing 34-3 and registered blood vessel image search processing/registration processing (read/write processing) 34-4, 34-6.

On the other hand, the IC card 5 has a CPU (Central Processing Unit) 50 and memory 52. The CPU 50 executes the other portion of the registered blood vessel image search/registration processing (read/write processing) 34-4, 34-6 of FIG. 8. The memory 52 has a management data area 54, biometrics data area 55, account information area 56, and history information area 57.

As shown in FIG. 12, the management data area 54 of the IC card 5 stores access management information 1-$n$, which associates the biometrics data sets 1-$n$ in the biometrics data area 55 with the account information sets 1-$n$ in the account information area 56.

Each of the access management information (management data) sets 54-1 (1-$n$) comprises a registered name, principal/proxy (authorized agent) distinction, biometrics attributes (for example, whether the registered blood vessel image is for the right or the left hand), temperature at time of biometrics data registration, dates of expiration for each of the account information indexes 1-$n$, monetary limits, and transaction flags (for example, withdrawal, deposit, transfer).

Each of the management data sets 54-1 (1-$n$) associates each of the biometrics data sets 1-$n$ in the biometrics data area 55 one-to-one with an index. On the other hand, the management data sets 54-1 (1-$n$) and the account information 56 are in a one-to-n relationship, with a plurality of account information sets associated by a single management data set. That is, the account indexes 1-$n$ of the management data 54-1 associate a plurality of account information sets, and transactions which are possible for an account (withdrawals, deposits, transfers, and similar) can be defined by transaction flags.

Account information stores the account number and account type (checking, ordinary, fixed-term, and similar). The history information area 57 stores transaction histories. A transaction history stores the transaction date, biometrics data number, account information number, and transaction flag.

Thus in this embodiment of the invention, a plurality of management data and biometrics data sets are stored in the IC card 5, and in addition the temperature at the time of biometrics data registration is stored in the management data. Using this temperature information, biometrics authentication appropriate to the time of use can be performed, as explained below.

Further, management data is used to associate biometrics data with account information. History information enables specification of a transaction user, even when storing a plurality of biometrics data sets.

Biometrics Characteristic Data Registration Processing

Figure 13:
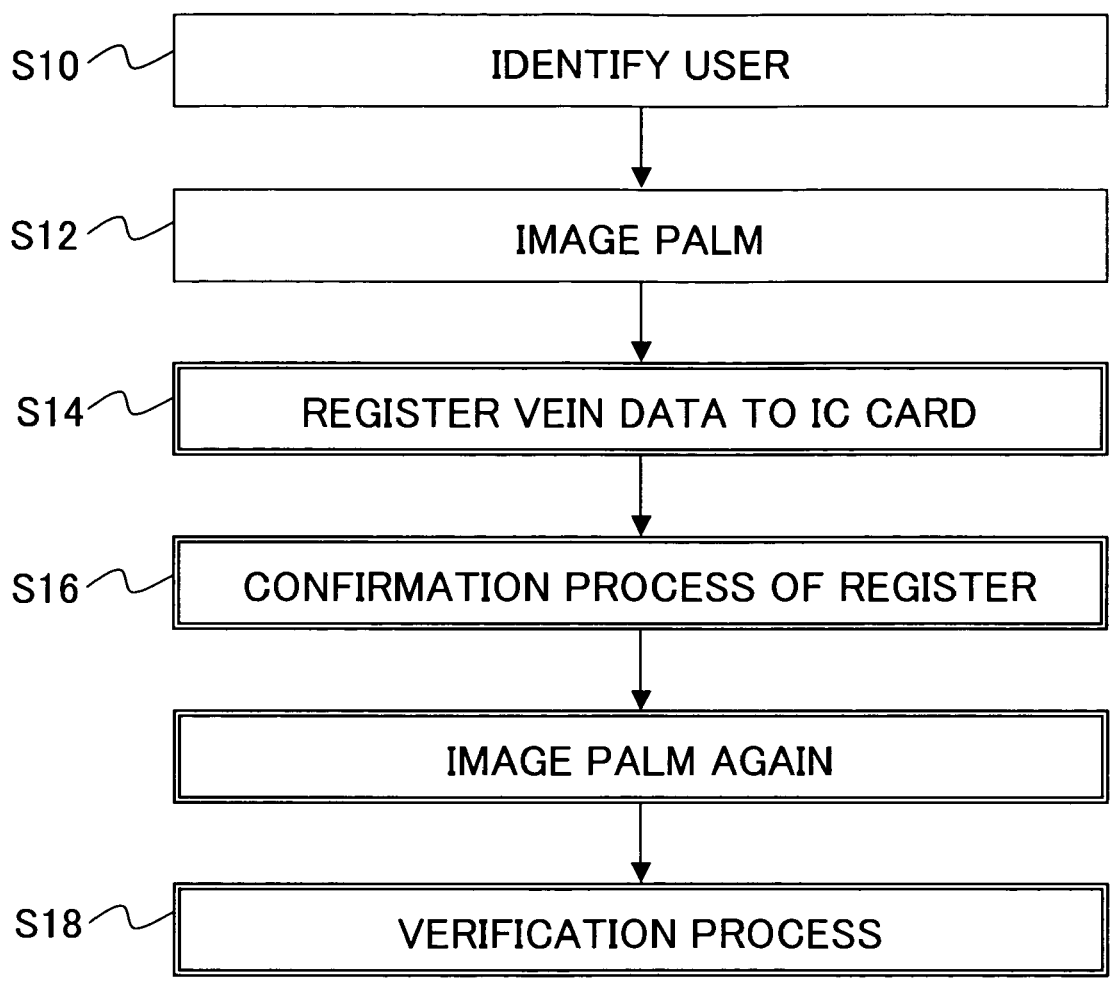
FIG. 13 shows the flow of biometrics characteristic data registration processing in FIG. 8.

Next, the biometrics characteristic data registration processing of FIG. 8 is explained using FIG. 13. FIG. 13 shows the flow of biometrics characteristic data registration processing in an IC card 5. This registration processing is explained for the case of the service area 2 of FIG. 1 and FIG. 2, but can also be performed by an ATM 6.

(S10) First, a user who has applied for biometrics authentication using an IC card presents the IC card and a driver's license or other documentation to confirm his identity at the service area 2, and receives identity confirmation from the issuing source.

(S12) Upon confirmation of identity, the user inserts the IC card 5 which he possesses into the IC card reader/writer 9 of FIG. 2. Upon insertion of the IC card 5 by the user, the API of the authentication library 69 (34 in FIG. 2) of FIG. 11 issues a read command to the API 46 of the IC card 5, and reads management data 54 in the IC card 5 (see FIG. 12).

(S14) When the user holds his hand over the image capture device 1, the authentication library 69 (34) of the control unit 38 in FIG. 2 executes the image capture processing 34-1, 34-2, 34-5 of FIG. 8, to acquire biometrics characteristic data (blood vessel image characteristic data). Then, the image capture processing of FIG. 8 is again executed, and biometrics characteristic data is again acquired. The API of the authentication library 69 (34) of FIG. 11 verifies the two biometrics characteristic data sets to confirm authentication. If the authentication result is OK, the temperature at the time of registration is detected using the temperature sensor 20 (or 20A) of the image capture device 1.

Then, the API of the authentication library 69 (34) in FIG. 11 issues a write command to the API 46 of the IC card 5, and writes the biometrics data 55 and management data 54 (see FIG. 7) of the IC card 5 are written. Specifically, biometrics characteristic data is written to the biometrics data area 55. Also, management data is created, comprising the selected principal/proxy distinction, name, account information index, transaction flags, temperature at time of registration, and similar, and is written to the management data area 54.

(S16) Next, registration confirmation processing is begun. That is, test authentication is performed. To this end, the user again extends his hand over the image capture device 1, and an image of the palm is captured.

(S18) Verification is performed using the authentication process explained below using FIG. 14. This result is used to determine whether the registered biometrics data can be used in authentication.

In this way, during registration, blood vessel image characteristic data and the temperature (of the hand) at the time of detection are stored in the IC card 5. Also, test authentication is performed to confirm the validity of the registered blood vessel image data. When registration ends, the authentication library 34 automatically erases data, so that confidentiality can be enhanced.

Biometrics Characteristic Data Verification Processing

Figure 14:
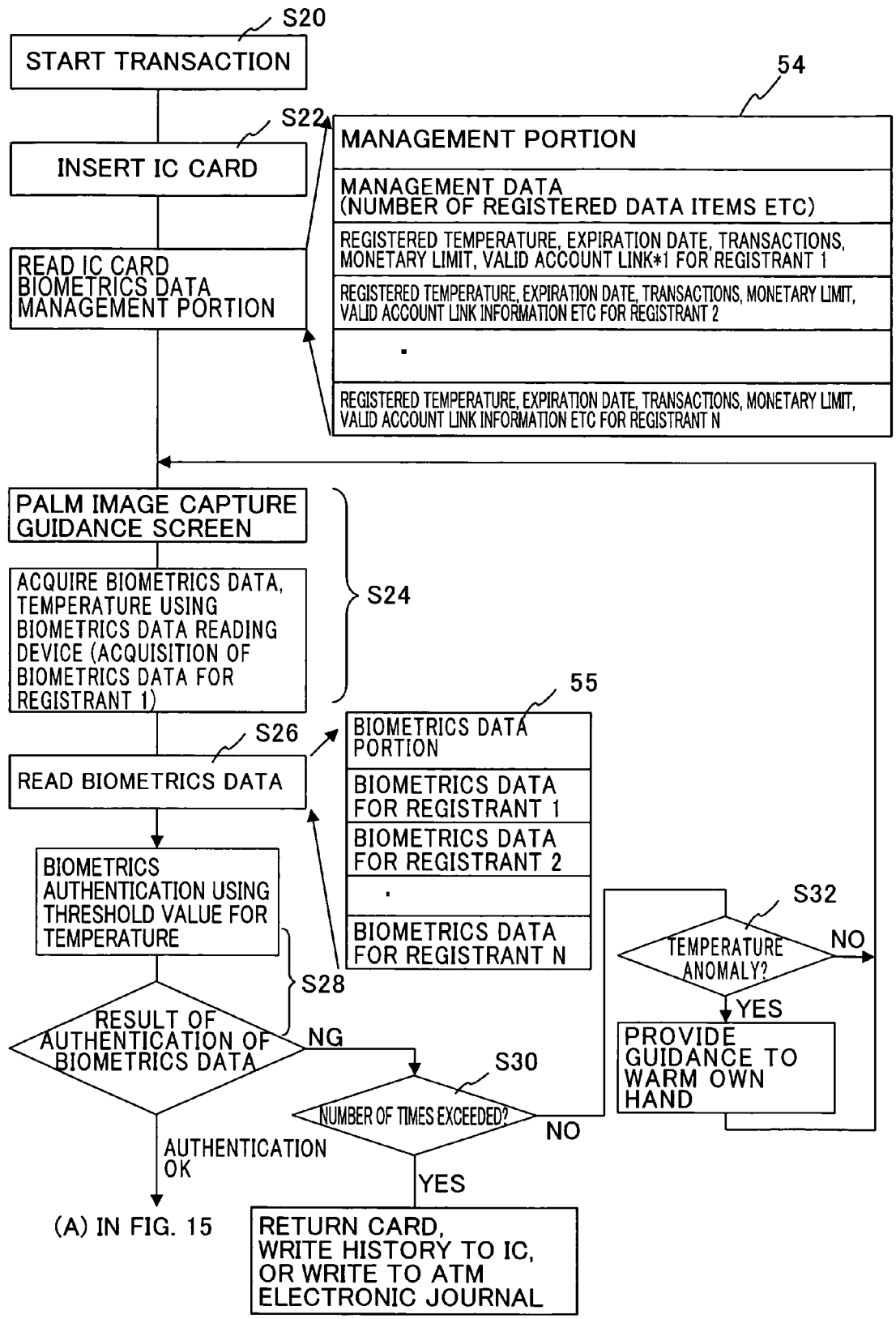
FIG. 14 is a first diagram of the flow of biometrics characteristic data verification processing in an embodiment of the invention.
Figure 15:
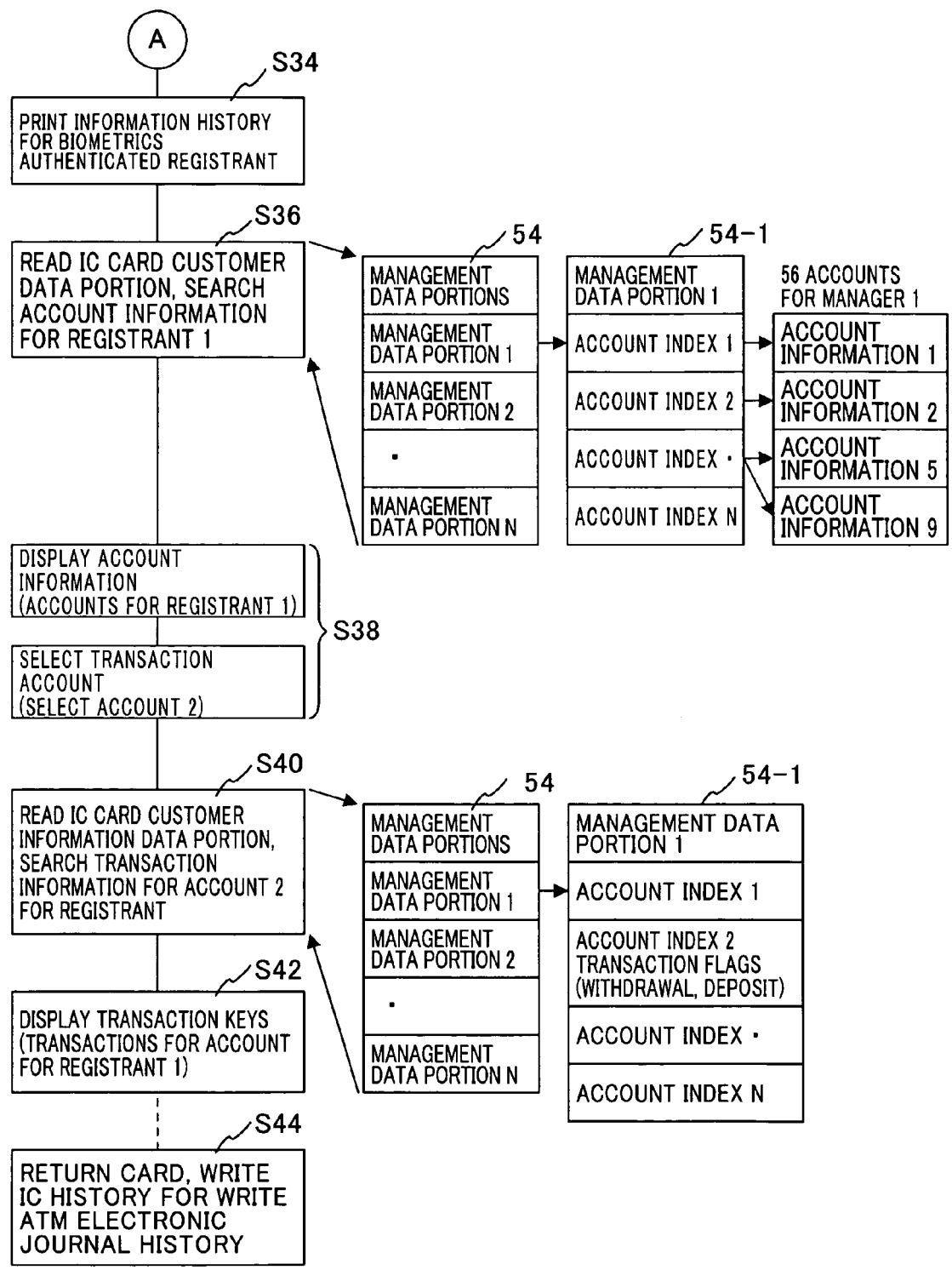
FIG. 15 is a second diagram of the flow of biometrics characteristic data verification processing in an embodiment of the invention.
Figures 16, 17:
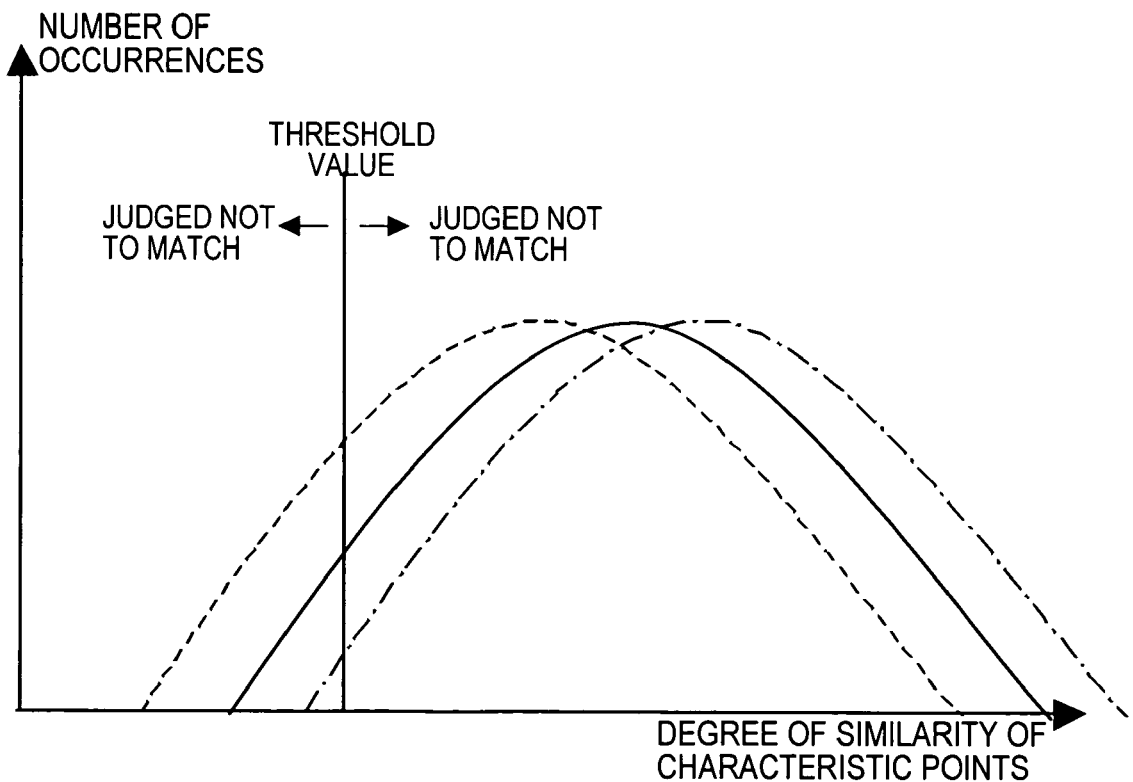
FIG. 16 shows the configuration of the threshold value correction table in the verification processing of FIG. 14.
FIG. 17 explains degree of similarity judgment in the verification processing of FIG. 14.

Next, the biometrics characteristic data verification processing of FIG. 8 is explained using FIG. 14 through FIG. 16. FIG. 14 shows the flow of transaction processing, including biometrics characteristic data verification processing using the IC card 5; FIG. 15 and FIG. 16 explain the blood vessel image data verification processing of FIG. 14. FIG. 14 shows the flow of transaction processing, including biometrics authentication processing, performed by the automated transaction machine 6; similar processing is performed at the service area 7.

(S20) In a customer wait state, the control unit 67 of the ATM 6 displays an IC card insertion screen on the UOP 6-1.

(S22) When an IC card 5 is inserted by a customer, the API of the authentication library 69 in FIG. 11 issues a read command to the API 46 of the IC card 5, and reads the management data 54 (see FIG. 12) in the IC card 5.

(S24) The control unit 67 of the ATM 6 displays a palm image capture screen on the UOP 6-1. The user extends his hand over the image capture device 1 according to the screen instructions. The control unit 67 of the ATM 6 executes the image capture processing 34-1, 34-2, 34-5 explained in FIG. 8, and acquires biometrics characteristic data and the temperature T at the time of use.

(S26) The API of the authentication library 69 of FIG. 11 issues a read command to the API 46 of the IC card 5, and reads the biometrics data 55 (see FIG. 12) in the IC card 5.

(S28) The API of the authentication library 69 of FIG. 11 verifies the biometrics data registered in the management data 54 against the biometrics characteristic data acquired by image capture, and performs authentication. The temperature is reflected in this authentication processing. That is, in verification processing, the degree of similarity of the numerous characteristic data items (that is, characteristic-point data) for two blood vessel images is calculated, and when the degree of similarity of characteristic points is high, the verification result is judged to be satisfactory. For example, when as shown in FIG. 17 the degree of similarity of characteristic points is plotted along the horizontal axis and the number of occurrences (number of appearances of the degree of similarity) is plotted along the vertical axis, a characteristic like that represented by the solid line in the figure is obtained. In general, perfect agreement is rare, and so a threshold value for the degree of similarity is set. And when the number of occurrences of a degree of similarity equal to or greater than the threshold value is far greater than the number below the threshold, the two blood vessel image data sets are judged to be the same.

When the temperature is high, human blood vessels are thicker, and it is easier to accurately extract characteristics from a blood vessel image; conversely, when the temperature is low the blood vessels become narrow, and extraction of characteristics from a blood vessel image becomes difficult. Consequently when the temperature during use is higher than the temperature at the time of registration, the peak in the degree of similarity is shifted to the right (that is, toward higher degrees of similarity), as indicated by the dot-dash line in FIG. 17. Conversely, when the temperature at the time of use is lower than during registration, the peak in the degree of similarity is shifted to the left (that is, toward lower degrees of similarity), as indicated by the dashed line in FIG. 17.

The threshold value is changed according to the temperature at the time of registration and the temperature at the time of use. Specifically, the standard threshold value Th is corrected using a threshold value correction function of the registration-time temperature X and the usage-time temperature T, so that when the temperature at the time of usage is higher than the temperature at the time of registration, the threshold value in FIG. 17 is shifted to the right (that is, in the direction of higher degree of similarity), and conversely, when the temperature at the time of usage is lower than the temperature at the time of registration, the threshold value in FIG. 17 is shifted to the left (in the direction of lower degree of similarity).

In this embodiment, a table of the usage-time temperature (verification temperature) T and threshold correction values, such as that in FIG. 16, is provided, so that the correction value for the threshold can be taken from the table using the verification table T, according to the difference n between the verification temperature T and the registration temperature X. In this table, the larger the positive difference (that is, the higher the verification temperature T compared with the registration temperature X), the larger is the threshold correction value in the positive direction; and the larger the negative difference (that is, the lower the verification temperature T compared with the registration temperature X), the larger is the threshold correction value in the negative direction. As a result, the standard threshold Th is larger when the temperature at time of use is higher than the registration-time temperature, and the threshold values of FIG. 17 are shifted to the right (that is, in the direction of higher degree of similarity); conversely, when the usage-time temperature is lower than the registration-time temperature, the standard threshold Th is smaller, and the threshold in FIG. 17 is shifted to the left (in the direction of lower degree of similarity). This threshold value is used to judge the degree of similarity of two blood vessel images and perform authentication.

(S30) When the authentication result in step S28 is not satisfactory (NG), a judgment is made as to whether the number of NG results is within a prescribed number. If the number of NG results has exceeded the prescribed number, the IC card 5 is returned. This fact is written to the history information 57 for the IC card, or is written to an electronic journal (memory) of the control unit 67 of the ATM 6, and processing ends.

(S32) On the other hand, if in step S30 the number of NG results does not exceed the prescribed number, a judgment is made as to whether there is a temperature anomaly. That is, if the corrected value of the threshold used in verification is more negative than a fixed value (for example, "−3" in FIG. 16), then a temperature anomaly is judged to have occurred. Upon judgment of a temperature anomaly, the control unit 67 displays a screen on the UOP 6-1 guiding the user to warm his hand, and returns to step S24. If on the other hand there is no temperature anomaly, processing returns to step S24.

(S34) Next proceeding advances to flow in FIG. 15. If on the other hand the authentication result in OK in step S28, the information for the person who has undergone biometrics authentication is printed on the journal printer of FIG. 7 as history information.

(S36) The customer data portion in the IC card 5 of the authenticated user (proxy or principal) is read. That is, the API of the authentication library 69 in FIG. 11 issues a search command to the API 46 of the IC card 5, and reads the account information 56 from the account index 54-1 of the management data 54 (see FIG. 7) in the IC card 5 for the relevant person.

(S38) The control unit 67 displays the read-out account information on the UOP 6-1. The user selects the account for the transaction (presses a displayed account) from the account information displayed on the UOP 6-1.

(S40) The customer information data portion within the IC card 5 of the authenticated proxy or principal is read. That is, the API of the authentication library 69 in FIG. 11 issues a search command to the API 46 of the IC card 5, and reads the transaction flags for the account index 54-1 of the management data 54 (see FIG. 12) in the IC card 5 for the relevant person.

(S42) The control unit 67 displays the registered transaction details for the read-out account on the UOP 6-1. The user selects the details of a transaction (presses a displayed transaction) from the transaction details displayed on the UOP 6-1. As a result, well-known transaction amount input, transfer destination input (in the case of transfers), and other transaction operations are performed, followed by communication with the host, to execute transaction processing.

(S44) As a result of the response from the host, cash is counted in the case of a withdrawal, and a receipt is printed. The IC card 5 is returned to the user with the receipt, and cash is dispensed. In addition, the history is written to the IC card 5, or, the history is written to the electronic journal of the ATM 6, and the transaction ends.

In this way, the temperature at the time of registration of the blood vessel image is stored, and from the difference with the temperature at the time of use (verification), the threshold value for verification judgment is changed, so that even when a difference in the characteristic data arises due to the thicknesses of blood vessels at the time of registration and at the time of use, verification errors do not readily occur, and more rigorous blood vessel image verification is possible.

Further, in the case of verification errors, the cause of the verification error is judged from the temperatures at the time of registration and at the time of use, so that whether a verification error is due to the temperature can be easily decided. And in the case of a verification error due to temperature, the user is notified and is guided to warm his hand, so that the user becomes aware of the cause of the problem, and can himself prevent in advance a reoccurrence of the verification error.

Other Biometrics Authentication Mechanisms

Figure 18:
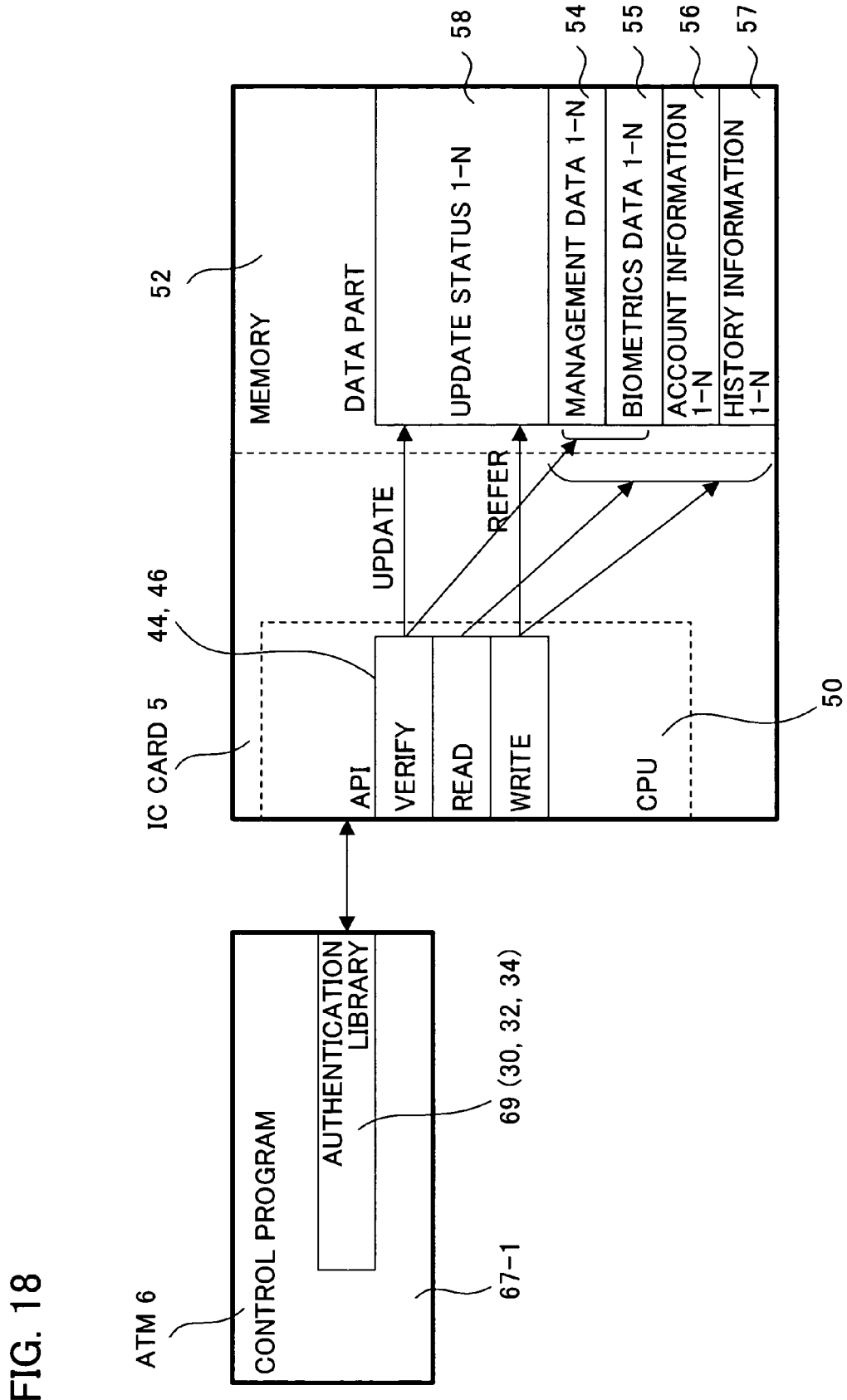
FIG. 18 is a block diagram of the configuration of biometrics authentication in another embodiment of the invention.

FIG. 18 shows the configuration of the authentication library 69 and IC card 5 of another embodiment of FIG. 8 and FIG. 11. As indicated in FIG. 18, the authentication library (program) 69 provided in the control program 67-1 of the ATM 6 has the distance/hand outline detection processing 34-1, guidance message output processing 34-5, and blood vessel image extraction processing 34-2 shown in FIG. 8.

On the other hand, the IC card 5 has a CPU (Central Processing Unit) 50 and memory 52. The CPU 50 executes the verification processing 34-3 and registered blood vessel image search/registration processing (read/write processing) 34-4, 34-6 shown in FIG. 8. The memory 52 has the management data area 54, biometrics data area 55, account information area 56, and history information area 57 shown in FIG. 12, and an update status area 58.

In this embodiment, verification processing 34-3 is provided within the IC card 5, and moreover update status information 58 is provided in each of the management data items 54. This verification processing 34-3 performs authentication processing, and when the object of the authentication processing is the principal, renders valid the update status information 58 (1-$n$). At times other than the time of registration, writing of management data 54 and biometrics information 55 can be executed if the update status information 58$m$ for the person in question is valid.

On the other hand, at times other than the time of registration, if the update status information 58$m$ for the person in question is invalid, an attempt to write management information 54 or biometrics information 55 causes an error to be returned. That is, when the authentication result for the principal is satisfactory, writing of biometrics information 55 and management information 54, that is, registration, modification, and deletion of proxies, are possible. By this means, the security of individual information within the IC card 5 is ensured, and in particular tampering becomes impossible, so that leakage of individual information (biometrics information, management information) can be prevented.

Other Biometrics Characteristic Data Authentication Processing

Figure 19:
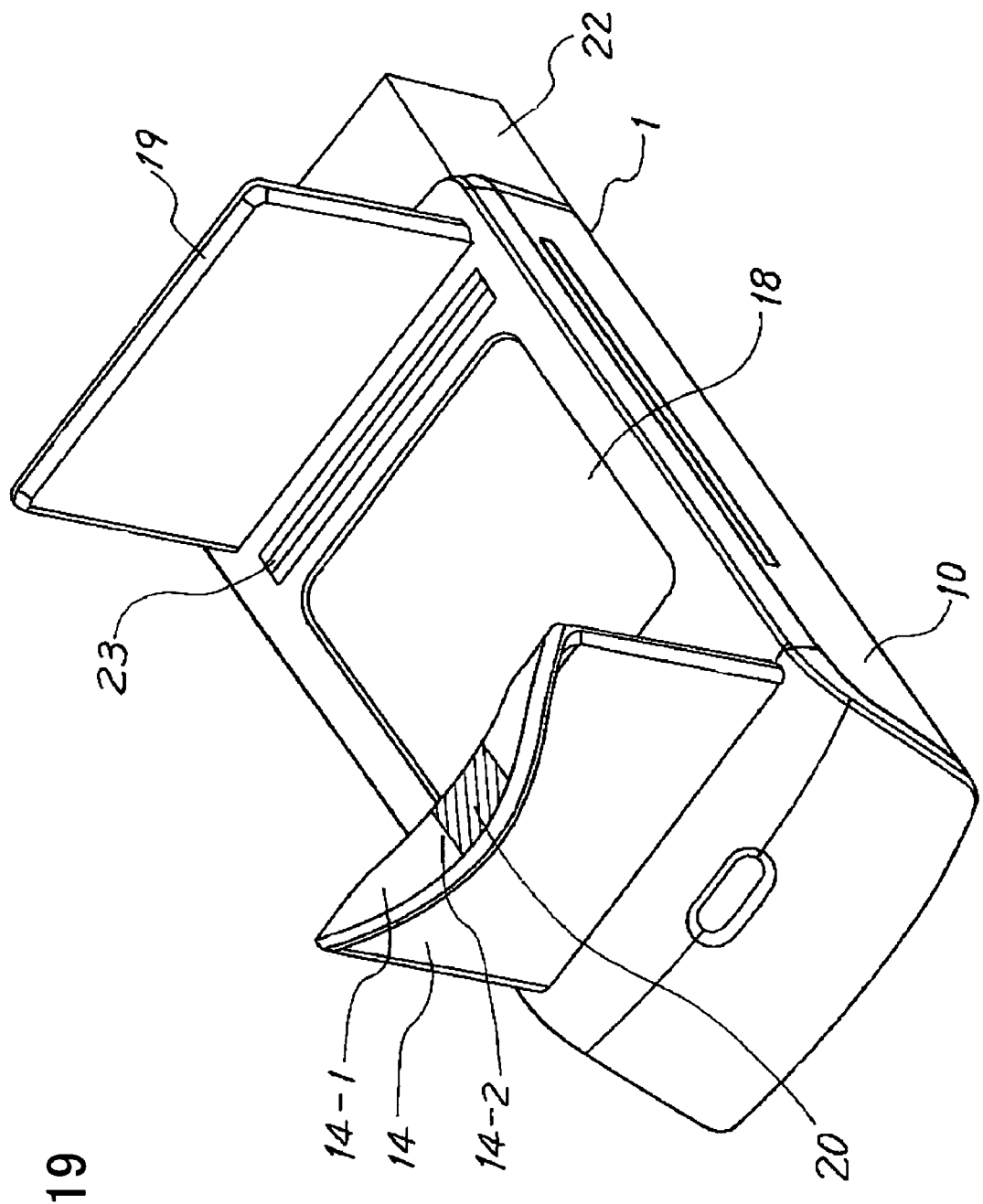
FIG. 19 explains the palm image capture device in another embodiment of the invention.

FIG. 19 shows the configuration of a palm reading device used in other biometrics characteristic data authentication processing of this invention. In FIG. 19, portions which are the same as those explained in FIG. 3 through FIG. 5 are assigned the same symbols. That is, in FIG. 19, the palm image capture devices 1, 1-1 have a sensor unit 18 mounted substantially in the center of the main unit 10. On the forward portion (on the user side) of the sensor unit 18 is provided a front guide 14; on the rear side is provided a rear guide 19. The front guide 14 serves the purposes of guiding the hand of the user in the front and of supporting the wrist.

The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist. The rear guide 19 serves to support the fingers.

A contact-type temperature sensor 20 is provided on the horizontal portion 14-1 which supports the wrist. The contact-type temperature sensor 20 comprises, for example, a resistive film the resistance of which changes with temperature; when the user places his wrist on the horizontal portion 14-1 of the front guide 14, as in FIG. 4, the contact-type temperature sensor 20 makes contact with the wrist, and detects the temperature of the wrist (that is, the temperature of the hand).

Further, a heater 22 is provided on the rear edge of the image capture device 1; a blower outlet 23 of the heater 22 is provided between the sensor 18 and the rear guide 19. In this embodiment, when a temperature anomaly such as described above is judged to have occurred, the heater 22 is started, and warm air is blown from the blower outlet 23 onto the palm above the sensor 18, so that the hand of the user is automatically warmed.

That is, in step S32 of FIG. 14, when a temperature anomaly is judged to have occurred, the control unit 67 displays a message on the UOP 6-1 notifying the user that the hand will be warmed, the heater 22 of the image capture device 1 is started, and warm air is blown from the blower outlet 23 onto the palm of the hand above the sensor 18, automatically warming the user's hand.

In this way also, repeated verification errors due to temperature differences can be automatically prevented.

Other Embodiments

Figure 20:
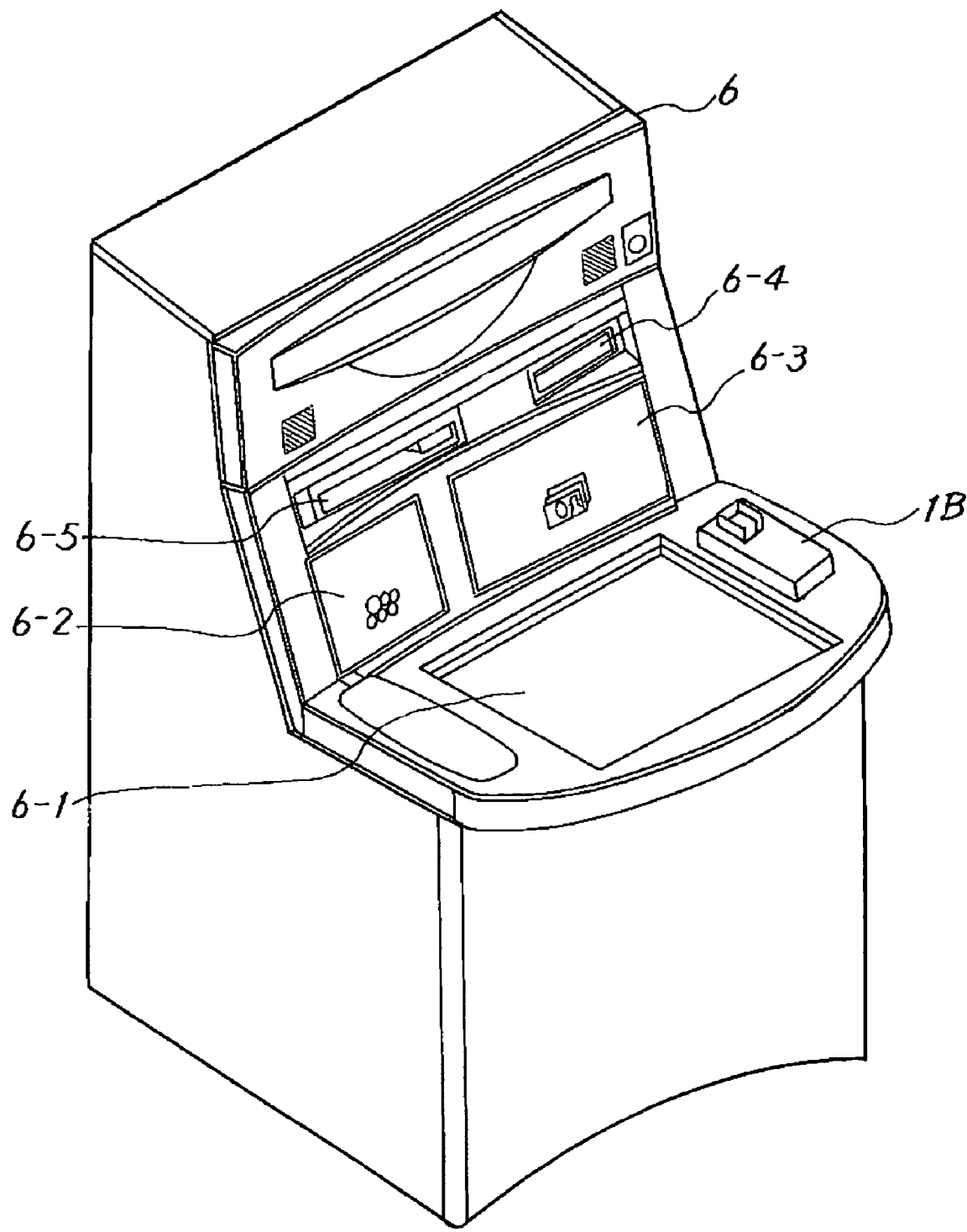
FIG. 20 is an external view of the ATM in another embodiment of the invention.
Figure 21:
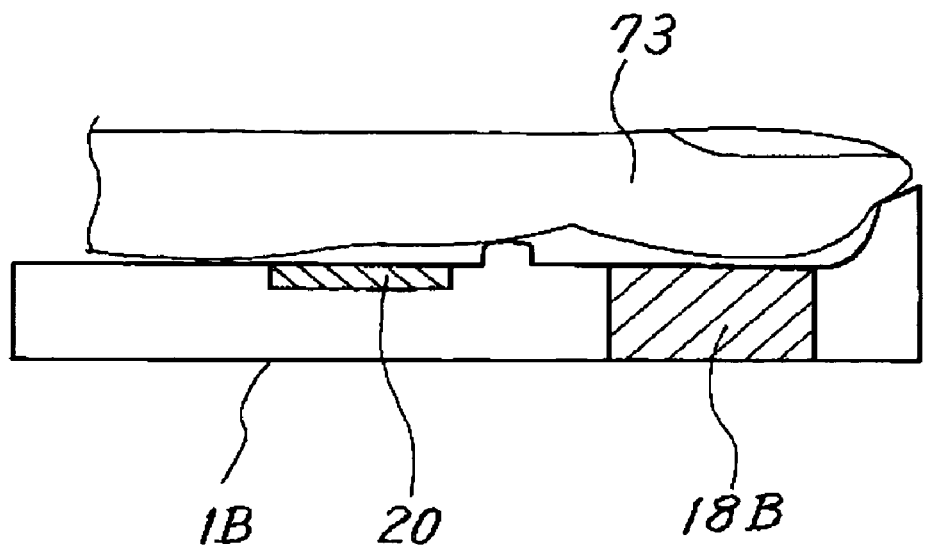
FIG. 21 is a cross-sectional view of the finger blood vessel image capture device of FIG. 20.

In the above embodiments, biometrics authentication was explained for the case of authentication using the vein pattern in the palm of a hand; but application to authentication of characteristics of the vein pattern in the fingers or of other blood vessels is also possible. FIG. 20 shows the configuration of an automated transaction device to which the blood vessel image reading device of another embodiment of the invention is applied; FIG. 21 is a cross-sectional view of the blood vessel image reading device of FIG. 20.

In FIG. 20, portions which are the same as in FIG. 6 and FIG. 7 are assigned the same symbols. That is, the ATM (automated transaction machine) 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display. In this example, the finger blood vessel image capture device 1B shown in FIG. 21 is provided on the side of the customer operation panel 6-1.

As shown in FIG. 21, the finger blood vessel image capture device 1B has a sensor 18B which captures a blood vessel image of a finger 73. Further, a temperature sensor 20 which detects the temperature of the finger 73 is provided in the front in the finger insertion direction of the image capture device 1B, as seen from the sensor 18B.

When using a finger blood vessel image capture device 1B with such a configuration also, the above-described registration and verification processing can be applied. In particular, when using blood vessel images of a finger, the effect of temperature is greater than for the palm of the hand, and the amount of information is smaller than for a blood vessel image of the palm, so that this method is more advantageous.

Figure 22:
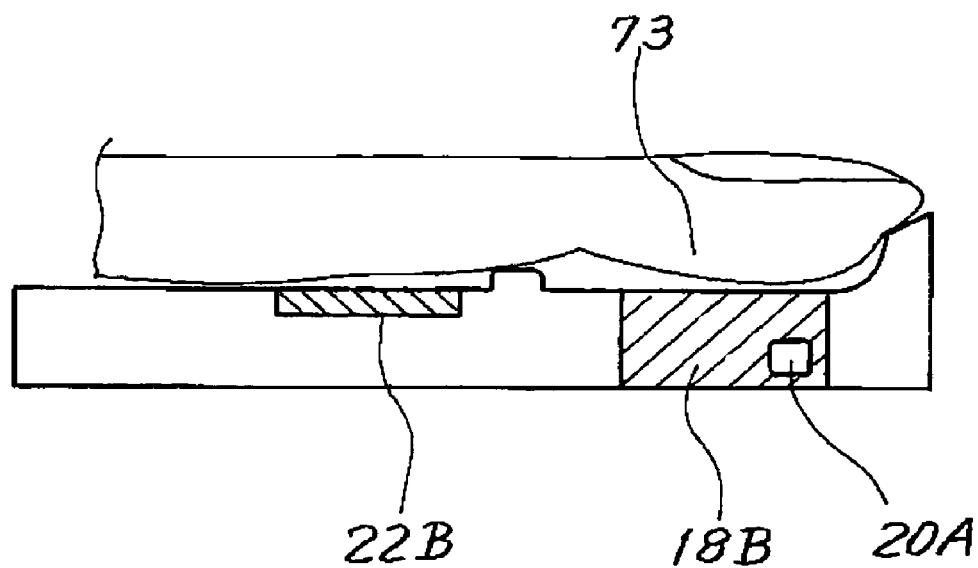
FIG. 22 is a cross-sectional view of another finger blood vessel image capture device of FIG. 20.

FIG. 22 is a cross-sectional view of another blood vessel image reading device of FIG. 20. In FIG. 22, portions which are the same as in FIG. 20 are indicated by the same symbols. In this example, a contact-free temperature sensor 20A is provided within the sensor 18B, and a heater 22B to warm the finger is provided in the front in the finger insertion direction of the image capture device 1B, as seen from the sensor 18B. This example corresponds to the embodiment of FIG. 19, and temperature anomalies can be detected, and the finger can be warmed, in a similar manner.

Blood vessel images are not limited to the palm or a finger, but may also be of the back of the hand or similar. Moreover, an example of automated equipment of a financial institution was explained; but application to automated ticket issuing equipment, automated vending equipment, and to automated machines and computers in other areas, as well as to door opening/closing equipment in place of keys, and to other equipment where individual authentication is required, is possible.

In the above-described embodiments, modification of threshold values was explained as a criterion for judgment of verification and authentication; but other judgment criteria can be adopted. Moreover, a combination of modifying the judgment criteria used in authentication, and screens to provide guidance to warm the hand or a heater to warm the hand, were explained; but modification of the judgment criteria for authentication alone, or a configuration in which a screen to provide guidance to warm the hand, or heating by a heater alone, provide similar advantageous results. Moreover, screens providing guidance to warm the hand may be combined with a heater for warming.

In the above, embodiments of the invention have been explained; but various modifications can be made to the invention within the scope of the invention, and these are not excluded from the scope of the invention.

In this invention, the temperature at the time of registration of a blood vessel image is stored together with the blood vessel image, and the temperature of the body is detected at the time of use (at the time of verification), so that the difference in the temperatures at the time of registration and at the time of use can be reflected in the verification processing, and when a verification error occurs, the cause of the verification error can be judged from the difference in temperatures at the time of registration and at the time of use; hence it is easy to discriminate verification errors due to temperature.

What is claimed is:

1. A biometrics authentication device, which uses blood vessel images of a body to perform individual authentication, comprising:
   an image capture device, which captures images of blood vessels in the body;
   a temperature detector, which detects the temperature of the body;
   an IC card reader/writer, which reads/writes an IC card which is stored characteristic data of blood vessel image of a user and the temperature at the time of registration of the blood vessel image characteristic data; and
   a control unit, which extracts the blood vessel image characteristic data from the captured blood vessel images and verifies captured the blood vessel image characteristic data against the blood vessel image characteristic data registered in the IC card in a verification processing,
   wherein the control unit detects the temperature during capture of the blood vessel image from the temperature detector, and distinguishes the cause of a verification error from the difference in the temperature detected at the time of the image capture and the temperature at the time of registration in the IC card.

2. The biometrics authentication device according to claim 1, wherein the control unit modifies a judgment criterion for the verification processing according to the difference in the temperature detected at the time of the image capture and the temperature at the time of registration in the IC card.

3. The biometrics authentication device according to claim 2, wherein the control unit modifies a threshold value for judging degree of similarity in the verification processing according to the difference in the temperature detected at the time of the image capture and the temperature at the time of registration in the IC card.

4. The biometrics authentication device according to claim 3, wherein further comprises a table which stores correction values of threshold values of criteria for judgements of degree of similarity in the verification processing, according to the difference in the temperature detected at the time of the image capture and the temperature at the time of registration in the IC card, and
   wherein the control unit references the table to modify the threshold values of criteria for judgements of degree of similarity in the verification processing.

5. The biometrics authentication device according to claim 1, wherein the control unit distinguishes the fact that an error in the verification is due to the difference between the temperature detected at the time of the image capture and the temperature at the time of registration in the IC card, and displays, on a display unit, a screen guiding the user to warm the body part from which the blood vessel image is captured.

6. The biometrics authentication device according to claim 1, further comprising a heater unit for warming the body part from which the blood vessel image of the user is captured,
   wherein the control unit distinguishes the fact that an error in the verification is due to the difference between the temperature detected at the time of the image capture and the temperature at the time of registration in the IC card, and operates the heater unit.

7. The biometrics authentication device according to claim 6, wherein the heater unit is provided in the image capture device.

8. The biometrics authentication device according to claim 1, wherein the temperature detector is provided in the image capture device.

9. A biometrics authentication method, which uses blood vessel images of a body to perform individual authentication, comprising the steps of:
- capturing an image of blood vessels in the body using an image capture device;
- detecting the temperature of the body, using a temperature detector;
- reading the characteristic data of a blood vessel image of a user and the temperature at the time of registration of the blood vessel image characteristic data from an IC card;
- extracting the blood vessel image characteristic data from the captured blood vessel image and verifying the blood vessel image characteristic data against the blood vessel image characteristic data registered on the IC card in a verification processing; and
- detecting the temperature at the time of capture of the blood vessel image from the temperature detector, and distinguishing the cause of a verification error from the difference between the temperature detected at the time of the image capture and the temperature at the time of registration in the IC card.

10. The biometrics authentication method according to claim 9, wherein the verification processing step further comprises a step of modifying a judgment criterion for the verification processing according to the difference in the temperature detected at the time of the image capture and the temperature at the time of registration in the IC card.

11. The biometrics authentication method according to claim 10, wherein the modification step comprises a step of modifying a threshold value for judging degree of similarity in the verification processing according to the difference in the temperature detected at the time of the image capture and the temperature at the time of registration in the IC card.

12. The biometrics authentication method according to claim 11, wherein the modification step comprises:
- a step of referencing a table which stores correction values of threshold values of criteria for judgements of degree of similarity in the verification processing, according to the difference in the temperature detected at the time of the image capture and the temperature at the time of registration in the IC card; and
- a step of modifying the threshold values of criteria for judgements of degree of similarity in the verification processing.

13. The biometrics authentication method according to claim 9, further comprising:
- a step of distinguishing the fact that an error in the verification is due to the difference between the temperature detected at the time of the image capture and the temperature at the time of registration in the IC card; and
- a step of displaying, on a display unit, a screen guiding the user to warm the body part from which the blood vessel image is captured.

14. The biometrics authentication method according to claim 9, further comprising:
- a step of distinguishing the fact that an error in the verification is due to a difference between the temperature detected at the time of the image capture and the temperature at the time of registration in the IC card; and
- a step of operating a heater unit for warming the body part from which the blood vessel image of the user is captured.

15. A blood vessel image reading device used in a biometrics authentication device which verifies a captured image of blood vessels in a body against a registered blood vessel image to perform individual authentication, comprising:
- an image capture unit which captures images of blood vessels in the body; and
- a temperature detector which detects the temperature of the body, further comprising a heater unit for warming up body part from which the blood vessel image is captured.

16. The blood vessel image reading device according to claim 15, wherein the heater unit is provided in the image capture unit.

17. The blood vessel image reading device according to claim 15, wherein the image capture unit comprises a unit which captures blood vessel images of a hand of the body.

18. The blood vessel image reading device according to claim 15, wherein the image capture unit comprises a unit which captures blood vessel images of a finger of the body.

* * * * *